United States Patent [19]
Schumacher

[11] Patent Number: 5,831,039
[45] Date of Patent: Nov. 3, 1998

[54] FIBER REACTIVE POLYAZO DYES CONTAINING TWO UREA GROUPS

[75] Inventor: Christian Schumacher, Kelkheim, Germany

[73] Assignee: DyStar Textilfarben GmbH & Co. Deutschland KG, Frankfurt, Germany

[21] Appl. No.: 60,494

[22] Filed: Apr. 15, 1998

[30] Foreign Application Priority Data

Apr. 15, 1997 [DE] Germany .................. 197 15 603.7

[51] Int. Cl.$^6$ .................. C09B 62/006; C09B 62/03; C09B 62/513

[52] U.S. Cl. .................. 534/634; 534/633; 534/642

[58] Field of Search .................. 534/633, 634, 534/642

[56] References Cited

U.S. PATENT DOCUMENTS

| 2,518,023 | 8/1950 | Keller et al. | 534/818 X |
| 2,988,544 | 6/1961 | Frey et al. | 534/818 X |
| 3,598,594 | 8/1971 | Freytag et al. | 534/818 X |
| 3,808,194 | 4/1974 | Piller et al. | 534/818 X |

*Primary Examiner*—Fiona T. Powers

[57] ABSTRACT

Fiber reactive azo dyes of the Formula (1)

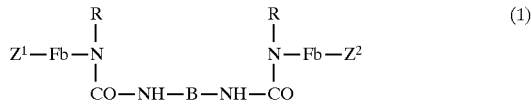

wherein the variables are as defined in the specification are useful for the dyeing of hydroxy- and carboxamido-containing materials, especially textile fiber materials, in clear shades with a high degree of fixation.

37 Claims, No Drawings

FIBER REACTIVE POLYAZO DYES CONTAINING TWO UREA GROUPS

The technology of dyeing is leading to ever greater requirements. In recent times the search has been on for dyes which even under low-salt dyeing conditions yield dyeings having high fixation rates and combining good wash fastness with other good fastness properties. At the same time they must not lack other properties, such as good dischargeability, in vat discharge printing for example.

Now, with the present invention, azo dyes have been found which comprise two azo chromophores joined to one another by way of bridges comprising urea groups, and which may preferably have one or more fiber-reactive groups. These dyes are of the formula (1)

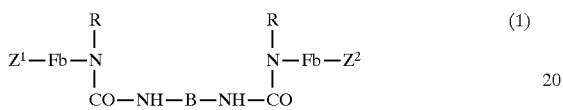

in which:

Fb is—at each occurrence, differently from or, preferably, identically to the other—the radical of a sulfo-containing monoazo, disazo or trisazo dye or the radical of a sulfo-containing metal complex monoazo or disazo dye, such as of a sulfo-containing 1:1 copper complex monoazo or disazo dye;

R is—at each occurrence, identically to or differently from the other—hydrogen, methyl or ethyl, preferably hydrogen;

B is a bridge consisting of an aliphatic and/or aromatic hydrocarbon with or without one or two olefinic bonds and possibly comprising 1 or 2 hetero-groups and is, for example, alkylene of 1 to 8 carbon atoms, such as methylene, ethylene, n-propylene, isopropylene and n-hexylene, or alkylene of 2 to 8 carbon atoms which is interrupted by 1 or 2 hetero-groups, such as groups of the formulae —O— and/or —NH—, or is, for example, a radical of the formula (2a), (2b), (2c), (2d) or (2e)

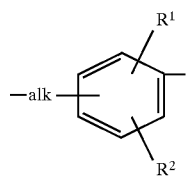

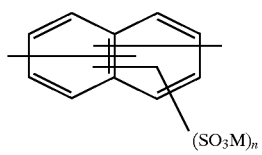

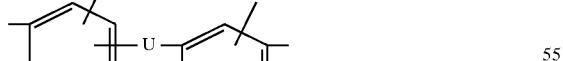

in which $R^1$ is hydrogen, alkyl of 1 to 4 carbon atoms, such as ethyl and especially methyl, alkoxy of 1 to 4 carbon atoms, such as ethoxy and especially methoxy, hydroxy, sulfo, carboxy, cyano, nitro, aminocarbonyl, alkanoylamino of 2 to 5 carbon atoms, such as acetylamino and propionylamino, benzoylamino, ureido, alkylcarbonyl of 2 to 5 carbon atoms, such as acetyl and propionyl, or halogen, such as chlorine, bromine or fluorine, $R^2$ is hydrogen, alkyl of 1 to 4 carbon atoms, such as ethyl and especially methyl, alkoxy of 1 to 4 carbon atoms, such as ethoxy and especially methoxy, sulfo, carboxy, aminocarbonyl or halogen, such as chlorine, bromine or fluorine, U is a direct covalent bond or is methylene, ethylene, vinylidene or a group of the formula —NH—, —NH—CH₂—, —CO—, —CH₂—NH—, —NH—CH₂—CH₂—, —CH₂—CH₂—NH—, —O—, —O—CH₂—, —O—CH₂—CH₂—, —CH₂—O—, —CH₂—CH₂—O—, —NH—CO—NH—, —NH—CO—, —NH—CO—O—, —CO—NH— or —O—CO—NH—, alk is alkylene of 1 to 8 carbon atoms or alkylene of 2 to 8 carbon atoms which is interrupted by 1 or 2 hetero-groups such as —O— and/or —NH—, M is hydrogen or an alkali metal, such as sodium, potassium or lithium, or the molar equivalent of an alkaline earth metal, such as of calcium, and is preferably hydrogen or an alkali metal, and n is zero, 1 or 2 (and if n is zero this group is hydrogen);

$Z^1$ is a fiber-reactive group from the heterocyclic series which is attached to Fb by way of an amino group of Fb and which is, in particular, from the halotriazine, halopyrimidine or dichloroquinoxazine series, or is a fiber-reactive group from the vinyl sulfone series or from the dihaloacryloylamino series or is a fiber-reactive grouping which consists of a combination of a fiber-reactive group from the heterocyclic series and from the vinyl sulfone series or of a substituted triazine radical with a fiber-reactive group from the vinyl sulfone series, or is a grouping with a β-hydroxyethylsulfonyl radical and/or with a hydroxy- or cyanoamino-containing triazine radical or a hydroxy-containing pyrimidine radical, where the heterocyclic radical is attached to Fb in each case by way of an amino group of Fb;

$Z^2$ is a fiber-reactive group from the heterocyclic series which is attached to Fb by way of an amino group of Fb and is, in particular, from the halotriazine, cyanoaminotriazine, halopyrimidine or dichloroquinoxazine series, or is a fiber-reactive group from the vinyl sulfone series or the dihaloacryloylamino series or is a fiber-reactive grouping which consists of a combination of fiber-reactive groups from the heterocyclic series and the vinyl sulfone series or of a substituted triazine radical with a fiber-reactive group from the vinyl sulfone series, where the heterocyclic radical is attached to Fb in each case by way of an amino group of Fb.

The definition "alkylene" includes straight-chain and branched alkylene groups.

In the formulae both above and below the individual constituents of the formula, either with the same or with a different designation within a formula, may within the scope of their definition have meanings which are identical to or different from one another.

The above- or below-mentioned groups "sulfo", "thiosulfato", "carboxy", "phosphato" and "sulfato" embrace both the acid form and the salt form of these groups. Accordingly, sulfo groups are groups of the formula —$SO_3M$, thiosulfato groups are groups of the formula —$S-SO_3M$, carboxy groups are groups of the formula —COOM, phosphato groups are groups of the formula —$OPO_3M_2$ and sulfato groups are groups of the formula —$OSO_3M$, where M is as defined above.

The dye radicals Fb possess one or more, such as 2 to 6, sulfo groups. They may contain further substituents customary with organic dyes. Examples of such substituents are alkyl groups of 1 to 4 carbon atoms, such as methyl, ethyl, propyl, isopropyl or butyl and of these preferably ethyl and especially methyl; alkoxy groups of 1 to 4 carbon atoms such as methoxy, ethoxy, propoxy, isopropoxy and butoxy and of these preferably ethoxy and especially methoxy; alkanoylamino groups of 2 to 5 carbon atoms, such as the acetylamino and the propionylamino groups; benzoylamino groups unsubstituted or substituted by sulfo, carboxy, methyl, ethyl, methoxy, ethoxy and/or chlorine; primary and mono- or disubstituted amino groups where the substituents are, for example, alkyl groups of 1 to 4 carbon atoms and/or phenyl groups, such as monoalkylamino and dialkylamino groups having 1 to 4 carbon atoms in the alkyl radical, phenylamino groups or N-($C_1$–$C_4$-alkyl)-N-phenylamino groups, where the alkyl radicals may also be substituted, for example by phenyl, sulfophenyl, hydroxy, sulfato, sulfo and carboxy, and where the phenyl groups may also be substituted, such as by chlorine, sulfo, carboxy, methyl and/or methoxy, examples being methylamino, ethylamino, propylamino, isopropylamino, butylamino, N,N-di(β-hydroxyethyl)amino, N,N-di(β-sulfatoethyl)amino, sulfobenzylamino, N,N-di(sulfobenzyl)amino and diethylamino groups and also phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups which may be mono- and disubstituted by alkyl of 1 to 4 carbon atoms and where the alkyl radicals in turn can be substituted, for example by hydroxy, sulfato, sulfo, carboxy, phenyl and sulfophenyl, examples being N-methylcarbamoyl and N-ethylcarbamoyl; sulfamoyl groups which can be mono- or disubstituted by alkyl groups of 1 to 4 carbon atoms, and N-phenyl-N-alkylsulfamoyl groups with an alkyl group of 1 to 4 carbon atoms, it being possible for these alkyl groups to be substituted in turn by hydroxy, sulfato, sulfo, carboxy, phenyl and sulfophenyl, examples being N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl) sulfamoyl; N-phenylsulfamoyl, ureido, hydroxy, carboxy, sulfomethyl and sulfo groups.

Important radicals Fb are those of a sulfo-containing dye of the benzene-azo-naphthol, of the benzene-azo-1-phenyl-5-pyrazolone, of the benzene-azo-benzene, of the naphthalene-azo-benzene, of the benzene-azo-aminonaphthalene, of the naphthalene-azo-naphthalene, of the naphthalene-azo-1-phenyl-5-pyrazolone, of the benzene-azo-pyridone and of the naphthalene-azo-pyridone series and those of a sulfo-containing 1:1 copper complex azo dye of the benzene and naphthalene series.

Examples of radicals Fb are those of the formulae (3a), (3b) and (3c)

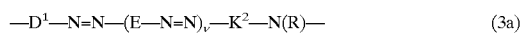

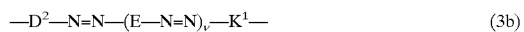

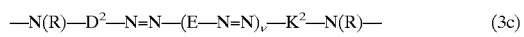

and of the heavy metal complex compounds derived therefrom, such as 1:1 copper complex compounds, in which R is as defined above, $D^1$ is the radical of a diazo component of the benzene or naphthalene series, $D^2$ is the radical of a diazo component of the diaminobenzene or diaminonaphthalene series, E is the radical of a diazotizable and coupleable middle component of the benzene or naphthalene series, $K^1$ is the radical of a coupling component of the benzene or napthalene series or from the heterocyclic series, such as of the pyrazolone, 6-hydroxy-2-pyridone or acetoacetarylamide series, $K^2$ is the radical of a coupling component of the aniline, aminonaphthalene, diaminobenzene, acetoacet (aminoaryl)amide, 1-(aminophenyl)pyrazolone or 1-(aminonaphthyl)pyrazolone series, where $D^1$, $D^2$, E, $K^1$ and $K^2$ can comprise one or more of the substituents specified for Fb and together do possess at least one, preferably at least two, sulfo groups, and where the amino group on $D^2$ and/or $K^2$ is part of the urea group joined to the radical B or, if $Z^1$ or $Z^2$ is a heterocyclic fiber-reactive radical, said radical is attached to said amino group of $D^2$ or $K^2$, and v is zero or 1.

Preference is additionally given as radicals Fb to those of the formulae (3d) and (3e)

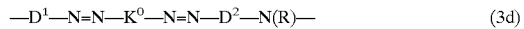

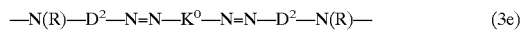

in which

R, $D^1$ and $D^2$ are as defined above and $K^0$ is the radical of a bivalent coupling component of the naphthalene series, where $D^1$, $D^2$ and $K^0$ together comprise at least one sulfo group.

Radicals Fb of the formulae (3d) and (3e) are, in particular, those of the formula (3f)

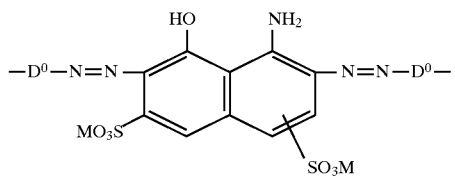  (3f)

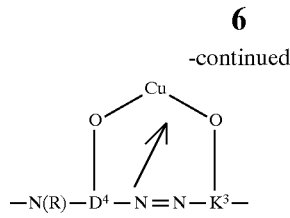  (3j)

in which M is as defined above and one $D^0$ has the meaning of $D^1$ and the other $D^0$ has the meaning of $D^2$ or both $D^0$s have the meaning of $D^2$ and where if $D^0$ is the same as $D^2$ the $D^0$ additionally comprises a group —N(R)— where R is as defined above.

Radicals Fb of 1:1 copper complex azo dyes are, for example, those of the formulae (3g) to (3j)

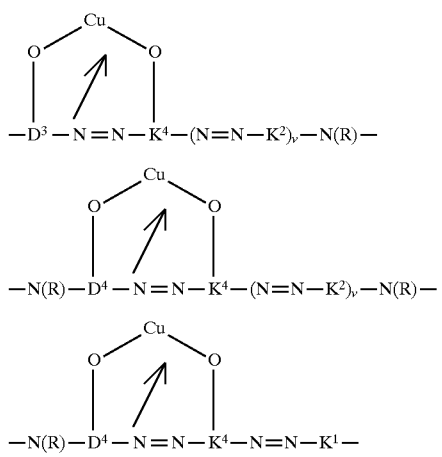

(3g)

(3h)

(3i)

in which

R, $K^2$ and v are as defined above, $D^3$ is the radical of a diazo component corresponding to the radical $D^1$ and containing, ortho to the azo group, the copper complex-binding oxy group, $D^4$ is the radical of a diazo component corresponding to the radical $D^2$ and containing, ortho to the azo group, the copper complex-binding oxy group, $K^3$ is the radical of a coupling component corresponding to the radical $K^1$ and possessing, ortho or vicinal to the azo group, the copper complex-binding oxy group, and $K^4$ is the radical of a coupling component corresponding to the radical $K^2$ and possessing, ortho or vicinal to the azo group, the copper complex-binding oxy group, and if v is zero $K^4$ is attached to a nitrogen atom of one of the urea groups.

The radicals $Z^1$ and $Z^2$ are referred to collectively below as Z.

Of the azo dyes of the formula (1) preference is given to those that are of the formulae (1A) to (1G):

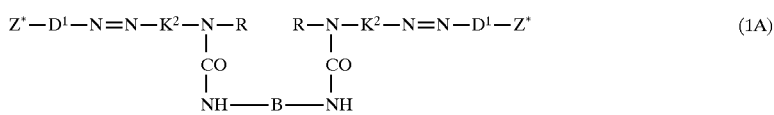  (1A)

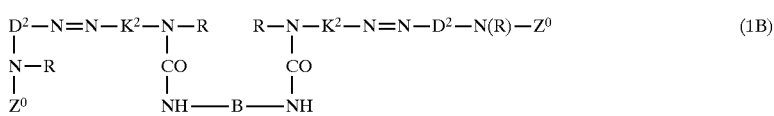  (1B)

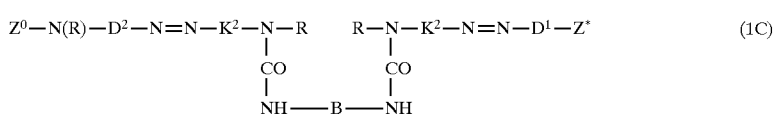  (1C)

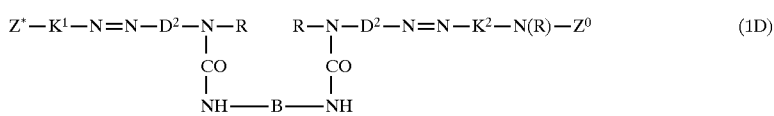  (1D)

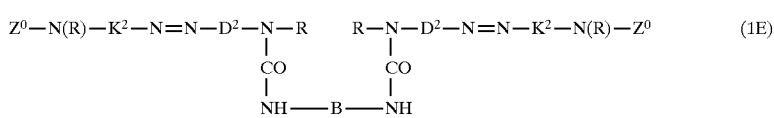  (1E)

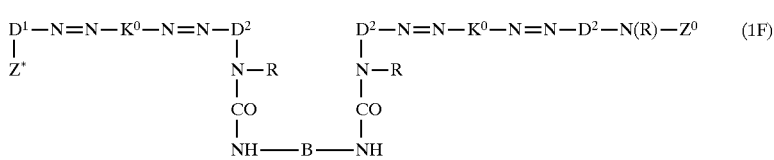  (1F)

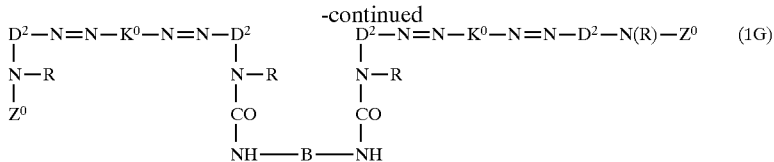

-continued $$D^2-N=N-K^0-N=N-D^2-N(R)-Z^0 \quad (1G)$$

in which
  B, R, $D^1$, $D^2$, $K^1$ and $K^2$ are as defined above,
  $Z^*$ is a nonheterocyclic fiber-reactive group in accordance with $Z^1$ or $Z^2$ and
  $Z^0$ is a heterocyclic fiber-reactive group or is another heterocyclic grouping in accordance with $Z^1$.

Radicals $Z-D^1-$ or

in which the fiber-reactive group Z is a nonheterocyclic group are, for example, those of the formulae (4a), (4b), (5a) and (5b)

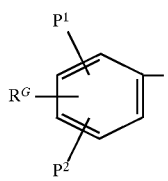 (4a)

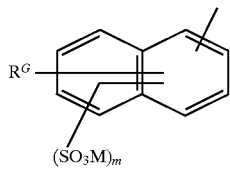 (4b)

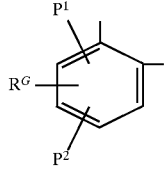 (5a)

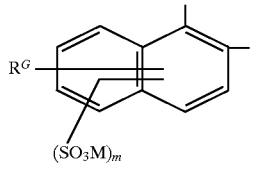 (5b)

in which
  $R^G$ is a fiber-reactive group of the formula (a)

$$Y-SO_2-W- \quad (a)$$

in which
  Y is vinyl or is ethyl which is substituted in the (β-position by an alkali-eliminable substituent, such as by chlorine, sulfato, thiosulfato, phosphato, acetyloxy and sulfophenylsulfonyloxy, and is preferably vinyl or β-sulfatoethyl, and
  W is a direct covalent bond or is alkylene of 1 to 4 carbon atoms, such as n-ethylene and n-propylene, or is an amino group of the formula (b)

 (b)

in which
  $R^0$ is hydrogen, alkyl of 1 to 4 carbon atoms, such as methyl and ethyl, or phenyl which is unsubstituted or substituted by 1 or 2 substituents from the group consisting of sulfo, methyl, methoxy, ethyl, ethoxy, carboxy and chlorine,
  $P^1$ is hydrogen, methyl, ethyl, methoxy, ethoxy, alkanoyl of 2 to 5 carbon atoms, such as acetyl and propionyl, cyano, sulfo, carboxy, alkoxycarbonyl of 2 to 5 carbon atoms, such as methoxycarbonyl and ethoxycarbonyl, carbamoyl, N-($C_1$-$C_4$-alkyl)carbamoyl, fluorine, chlorine, bromine or trifluoromethyl,
  $P^2$ is hydrogen, methyl, ethyl, methoxy, ethoxy, cyano, nitro, carboxy, sulfo, chlorine, alkanoylamino of 2 to 5 carbon atom, such as acetylamino, alkoxycarbonyl of 2 to 5 carbon atoms, such as methoxycarbonyl and ethoxycarbonyl, carbamoyl, N-($C_1$-$C_4$-alkyl) sulfamoyl, sulfophenylamidocarbonyl, phenylamidocarbonyl, alkylsulfonyl of 1 to 4 carbon atoms, phenylsulfonyl or phenoxy,
  where the benzene nucleus in formulae (4a) and (4b) may additionally comprise a hydroxy group ortho to the free bond which leads to the azo group,
  m is zero, 1 or 2 (and if m is zero this group is a hydrogen atom) and
  M is as defined above.

Of these definitions, $P^1$ is preferably hydrogen, methyl, methoxy, bromine, chlorine, sulfo or carboxy and $P^2$ is preferably hydrogen, methyl, methoxy, chlorine, carboxy, sulfo or acetylamino.

Examples of groups of the formulae (4a) and (4b) are:
2-(β-sulfatoethylsulfonyl)phenyl, 3-(β-sulfatoethylsulfonyl)phenyl,
4-(β-sulfatoethylsulfonyl)phenyl, 2-carboxy-5-(β-sulfatoethylsulfonyl)-phenyl, 2-chloro-3-(sulfatoethylsulfonyl)phenyl, 2-chloro-4-(β-sulfatoethylsulfonyl)-phenyl,
2-bromo-4-(β-sulfatoethylsulfonyl)phenyl, 4-methoxy-3-(β-sulfatoethylsulfonyl)phenyl, 4-chloro-3-(β-sulfatoethylsulfonyl)phenyl, 2-ethoxy-
4- or -5-(1-sulfatoethylsulfonyl)phenyl, 2-methyl-4-(β-sulfatoethylsulfonyl)phenyl, 2-methoxy-5- or -4-(β-sulfatoethylsulfonyl)phenyl,
2,4-diethoxy-5-(β-sulfatoethylsulfonyl)phenyl, 2,4-dimethoxy-5-(β-sulfatoethylsulfonyl)phenyl,
2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl,
2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5(β-chloroethylsulfonyl)phenyl, 2-hydroxy-5-(β-sulfatoethylsulfonyl)phenyl,
2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, 4-[N-methyl-N-(β-sulfatoethylsulfonyl)]aminophenyl, 3-[N-methyl-N-(βsulfatoethylsulfonyl)]aminophenyl, 4-[β-(β'-sulfatoethylsulfonyl)ethyl]phenyl, 3- or 4-[β-(β'-chloroethylsulfonyl)ethylamino]-phenyl, 3- or 4-[β-(β'-sulfatoethylsulfonyl)-ethylamino]phenyl, 3- or 4-[γ-(β'-chloroethylsulfonyl)propylamino]phenyl, 3- or 4-[γ-(β'-sulfatoethylsulfonyl)propylamino]phenyl, 3- or 4-[γ-(vinylsulfonyl)propylamino]phenyl, 4-[β-(β'-sulfatoethylsulfonyl)ethylamino]-2- or -3-sulfophenyl, 4-[β-(β'-chloroethylsulfonyl)ethylamino]-2- or -3-sulfophenyl, 4-[γ-(β'-sulfatoethylsulfonyl)propylamino]-2- or -3-sulfophenyl, 4-[γ-(β'-chloroethylsulfonyl) propylamino]-2- or -3-sulfophenyl, 4-[β-(β'-chloroethylsulfonyl)ethylamino]-2-carboxyphenyl, 4-[β-(β'-sulfatoethylsulfonyl)ethylamino]-2-carboxyphenyl, 4-[γ-(β'-chloroethylsulfonyl) propylamino]-2-carboxyphenyl, 4-[γ-(β'-sulfatoethylsulfonyl)propylamino]-2-carboxyphenyl, 4-{N-phenyl-N-[β-(β'-chloroethylsulfonyl)ethyl]}aminophenyl, 4-{N-phenyl-N-[β-(β'-sulfatoethylsulfonyl)ethyl]}aminophenyl, 3-{N-phenyl-N-[β(β'-chloroethylsulfonyl)ethyl]}aminophenyl, 3-{N-phenyl-N-[β-(β'-sulfatoethylsulfonyl)ethyl]}aminophenyl, 4-{N-3"-sulfophenyl-N-[β-(β'-chloroethylsulfonyl)ethyl]}amino-phenyl, 4-{N-3"-sulfophenyl-N-[β-(β'-sulfatoethylsulfonyl)ethyl]} aminophenyl, 4-{N-phenyl-N-[γ-(β'-chloroethylsulfonyl)propyl]} aminophenyl, 4-{N-phenyl-N-[γ-(β'-sulfatoethylsulfonyl)propyl]} aminophenyl, 3-{N-phenyl-N-[γ-(β'-chloroethylsulfonyl)propyl]} aminophenyl, 3-{N-phenyl-N-[γ-(β'-sulfatoethylsulfonyl)propyl]} aminophenyl, 4-{N-3"-sulfophenyl-N-[γ-(β'-chloroethylsulfonyl)propyl]} aminophenyl and 4-{N-3"-sulfophenyl-N-[γ-(β'-sulfatoethylsulfonyl) propyl]} aminophenyl.

Groups corresponding to the formula radicals —D¹—N=N—E— are for example 4-(4'-sulfophenyl)azo-6-sulfonaphth-1-yl, 4-[4'-(β-sulfatoethylsulfonyl)phenyl]azo-2-methyl-5-methoxyphenyl, 4-[3'-(β'-sulfatoethylsulfonyl) phenyl]azo-3-methylphenyl, 4-[4'-(β-sulfatoethylsulfonyl) phenyl]azo-3-ureidophenyl, 4-[6'-(β-sulfatoethylsulfonyl) naphth-2'-yl]azo-3-ureidophenyl and 7-[2'-methoxy-5'-(β-sulfatoethylsulfonyl)phenyl]azo-8-hydroxy-6-sulfonaphth-3-yl.

Radicals Z—N(R)—D²— where Z is a heterocyclic fiber-reactive group Z⁰ of compounds of the formula Z—N(R)—D²—NH₂ which serve as diazo components or of diaminobenzene and diaminonaphthalene compounds thereof corresponding to the formula HRN—D²—NH₂ are preferably radicals of the formulae (6a) and (6b)

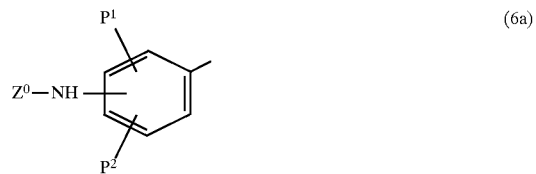

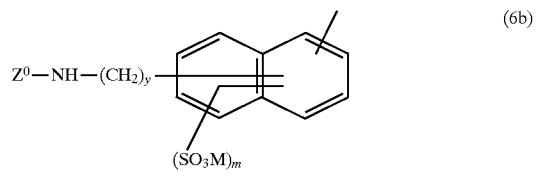

in which $Z^0$, M, m, $P^1$ and $P^2$ have the meanings given above, especially the preferred meanings, and y is zero, 1 or 2, where the respective benzene nucleus may additionally comprise a hydroxy group ortho to the free bond which leads to the azo group.

Radicals $D^2$ are therefore preferably radicals of the formulae (6y) and (6z)

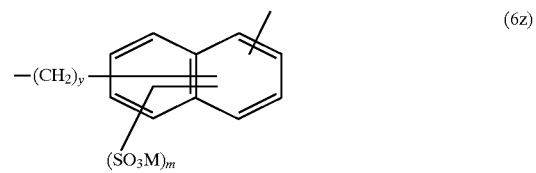

in which $P^1$, $P^2$, y, M and m are as defined above, and with particular preference are 1,3-phenylene, 1,4-phenylene, 4-sulfo-1,3-phenylene, 3-sulfo-1,4-phenylene, 2,5-disulfo-1,4-phenylene, 2,5-disulfo-1,3-phenylene, 4,6-disulfo-1,3-phenylene, 2-methyl-1,3-phenylene and 2-methoxy-1,3-phenylene.

Aromatic radicals E of a couplable and diazotizable compound of the formula H—E—NH₂ are, for example, those of the formulae (7a), (7b) and (7c)

-continued

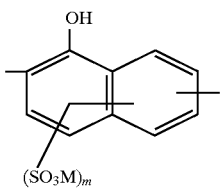 (7c)

in which

P¹, M and m are as defined above and

P³ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido having 1 to 4 carbon atoms in the alkyl radical, phenylsulfonyl or alkylsulfonyl of 1 to 4 carbon atoms.

Radicals —K¹—Z of coupling components of the formula H—K¹—Z in which Z is a nonheterocyclic fiber-reactive group are, for example, those of the formulae (8a) to (8h)

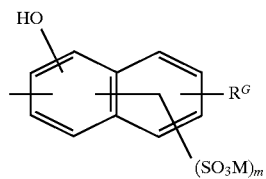 (8a)

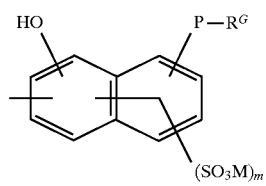 (8b)

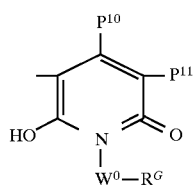 (8c)

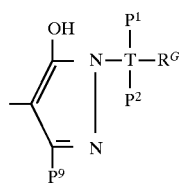 (8d)

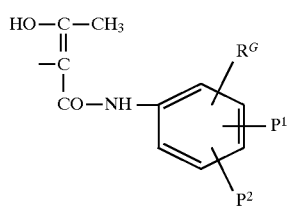 (8e)

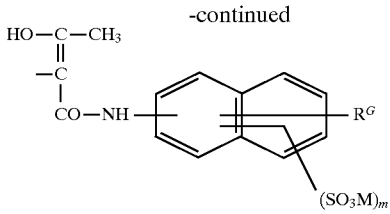 (8f)

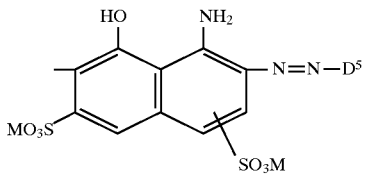 (8g)

in which $R^G$, P¹, P², m and M are as defined above,

P is alkylenecarbonylamino of 2 to 5 carbon atoms, such as propylenecarbonylamino and ethylenecarbonylamino, or is phenylaminocarbonylamino which can be substituted in the phenylene radical by substituents from the group consisting of chlorine, methyl, methoxy, sulfo and carboxy, or is phenylenecarbonylamino which can be substituted in the phenyl radical by substituents from the group consisting of chlorine, methyl, methoxy, nitro, sulfo and carboxy, where the fiber-reactive $R^G$ is attached to an alkylene carbon atom or to a phenylene carbon atom of P, P⁹ is hydrogen, alkyl of 1 to 4 carbon atoms, such as methyl, cyano, carboxy, carboalkoxy of 2 to 5 carbon atoms, such as carbomethoxy and carboethoxy, carbamoyl or phenyl, preferably methyl, carboxy, methoxycarbonyl, ethoxycarbonyl or phenyl and especially methyl or carboxy, T is a benzene or naphthalene ring, preferably a benzene ring, P¹⁰ is hydrogen or alkyl of 1 to 4 carbon atoms, such as methyl, or is phenyl or alkyl of 1 to 4 carbon atoms substituted by alkoxy of 1 to 4 carbon atoms, such as methoxy, or by cyano, and is preferably alkyl of 1 to 4 carbon atoms or phenyl, P¹¹ is hydrogen, chlorine, bromine, sulfo, carbamoyl, methylsulfonyl, phenylsulfonyl, cyano or sulfoalkyl of 1 to 4 carbon atoms, preferably hydrogen, sulfo, sulfoalkyl having an alkyl radical of 1 to 4 carbon atoms, such as sulfomethyl, cyano or carbamoyl, W⁰ is alkylene of 1 to 4 carbon atoms, methylenephenylene, ethylenephenylene, phenylenemethylene, phenyleneethylene or phenylene, or is methylenephenylene, ethylenephenylene or phenylene each of which is substituted in the benzene radical by fluorine, chlorine, bromine, methyl, methoxy, cyano, sulfo, carboxy, acetyl, nitro, carbamoyl and/or sulfamoyl, and D⁵ is a radical of the formula (4al or (4b).

Radicals

where Z is a nonheterocyclic fiber-reactive group of coupling components of the formula H—K¹—$R^G$ or H—K³(OH)—$R^G$ are, for example, radicals of the formulae

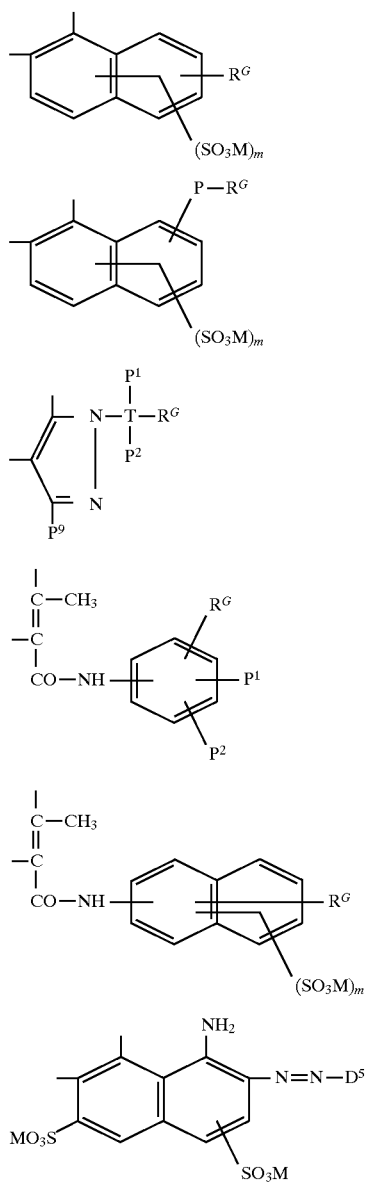

in which the individual radicals in the formulae are as defined above.

Radicals —K²—N(R)—Z and

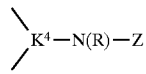

of coupling components of the formula H—K²—N(R)—Z and H(HO)K⁴—N(R)—Z where Z is a heterocyclic fiber-reactive group $Z^0$, or of coupling components of the formulae H—K²—NRH and H(HO)K⁴—NRH in whose amino group it is subsequently necessary to introduce the heterocyclic fiber-reactive radical, are, for example, radicals of the formulae (9a) to (9i) or, respectively, (9v) to (9z)

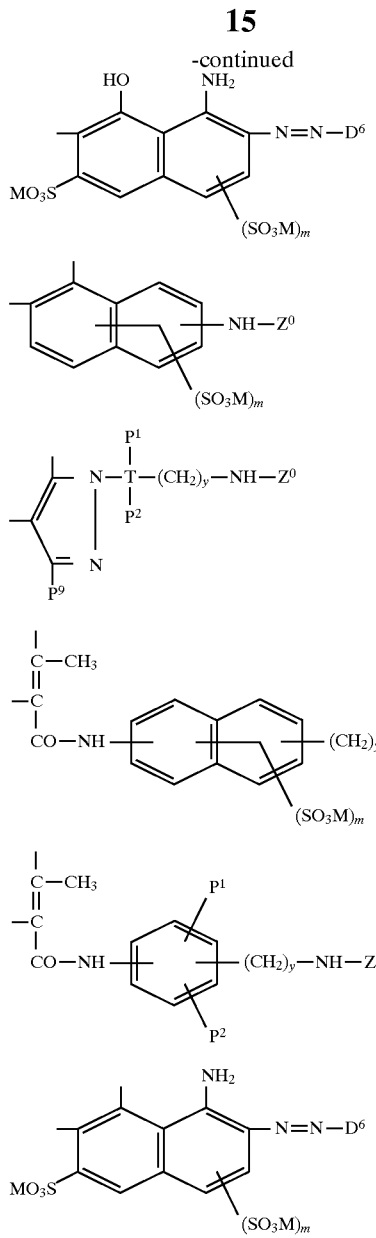

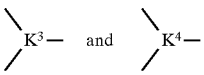

in which $P^1$ $P^2$, $P^9$, $P^{10}$, $P^{11}$, $W^0$, T, M, m and $Z^0$ have the meanings given above, especially the preferred meanings, y is zero, 1 or 2, $P^5$ is hydrogen, alkyl of 1 to 4 carbon atoms such as methyl and ethyl, alkoxy of 1 to 4 carbon atoms such as methoxy and ethoxy, bromine, chlorine or sulfo, $P^6$ is hydrogen, alkyl of 1 to 4 carbon atoms such as methyl and ethyl, alkoxy of 1 to 4 carbon atoms such as methoxy and ethoxy, chlorine, alkanoylamino of 2 to 7 carbon atoms such as acetylamino and propionylamino, ureido or phenylureido, and $D^6$ as the radical of a diazo component is a radical of the formula (6a) or (6b) defined and specified above.

In the above formulae (8a), (8b) and (9a) the free bond which leads to the azo group is attached to the aromatic nucleus ortho to the hydroxy group.

Radicals $K^2$ are in particular the radicals minus the group —NH—$Z^0$ of the formulae (9a) to (9f) and (9g), preferably of formula (9a), with the hydroxy group preferably in the α position of the naphthalene ring.

Radicals

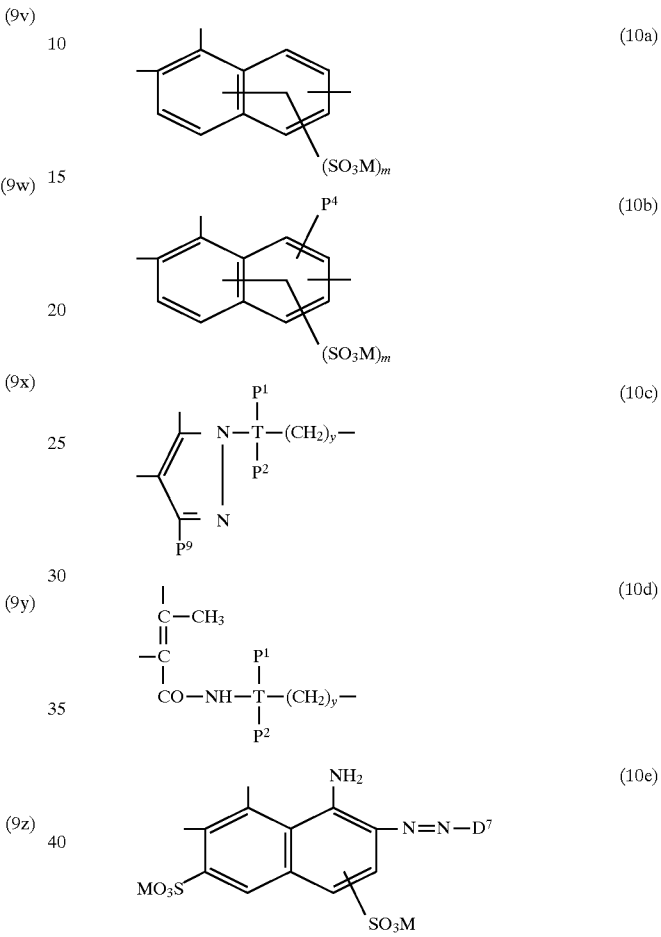

are, in particular, those of the formulae (10a) to (10e)

in which the individual constituents of each formula are as defined above and $D^7$ has the meaning of $D^5$ and $D^6$.

Examples of fiber-reactive radicals Z are the radicals α,β-dibromoacryloylamino, 2,3-dichloroquinoxazine-6-carbonyl, 2,4-dichloro-1,3,5-triazin-6-yl and, in particular, fiber-reactive radicals corresponding to the abovementioned and defined formula radical $R^G$ and to the following formulae (11a) to (11h)

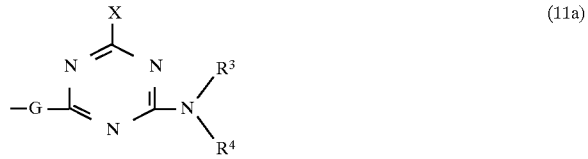

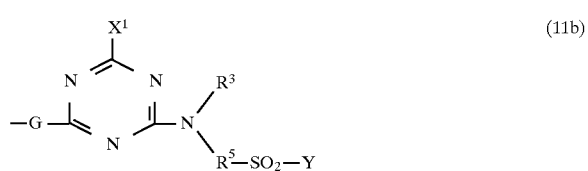

-continued

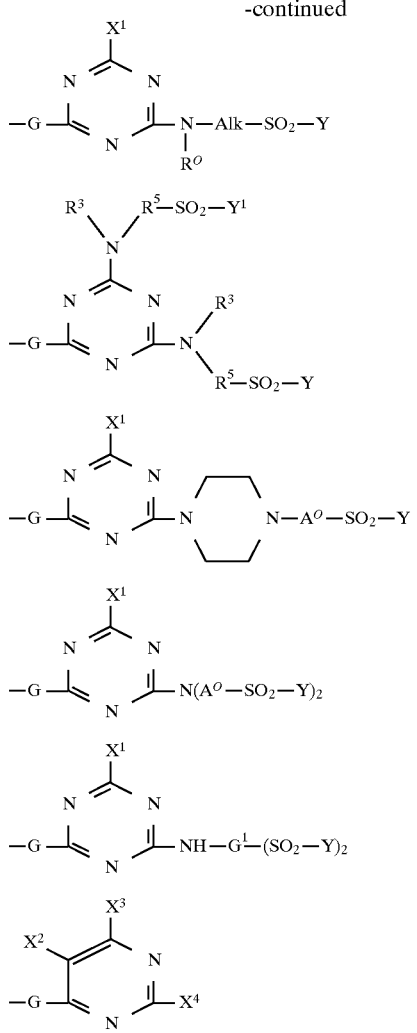

in which:
R⁰ is as defined above;
Alk is alkylene of 2 to 4 carbon atoms;
A⁰ is alkylene of 1 to 3 carbon atoms, such as ethylene and propylene;
X is chlorine or fluorine;
$X^1$ is chlorine, fluorine, cyanoamino or methoxy, preferably chlorine or fluorine;
$X^2$ is hydrogen, halogen such as fluorine or especially chlorine, or cyano;
$X^3$ is hydrogen, halogen, such as chlorine and fluorine, methylsulfonyl or hydroxy and
$X^4$ is hydrogen, halogen, such as chlorine and fluorine, methyl, methylsulfonyl or hydroxy,
where at least $X^3$ or $X^4$ is halogen or methylsulfonyl or preferably $X^3$ and $X^4$ are both halogen;
$R^3$ is hydrogen, alkyl of 1 to 4 carbon atoms, such as methyl and ethyl, which can be substituted by chlorine, sulfo, carboxy, sulfato, phosphato, hydroxy, alkanoyloxy of 2 to 5 carbon atoms, such as propionyloxy and acetyloxy, cyano and alkoxy of 1 to 4 carbon atoms, such as methoxy and ethoxy, or is cycloalkyl having 5 to 8 carbon atoms, such as cyclohexyl and methylcyclohexyl;
$R^4$ is hydrogen, alkyl of 1 to 4 carbon atoms, such as methyl and ethyl, which can be substituted by chlorine, sulfo, carboxy, sulfato, phosphato, hydroxy, alkanoyloxy of 2 to 5 carbon atoms, such as propionyloxy and acetyloxy, cyano and alkoxy of 1 to 4 carbon atoms, such as methoxy and ethoxy, or is cycloalkyl having 5 to 8 carbon atoms, such as cyclohexyl and methylcyclohexyl, or is cyano or is phenyl which can be substituted by 1 or 2 substituents from the group consisting of sulfo, carboxy, methyl, ethyl, methoxy, ethoxy, chlorine, carbamoyl, sulfamoyl and cyano, or is naphthyl such as naphth-2-yl, substituted by 1, 2 or 3 sulfo groups, preferably by 1 or 2 sulfo groups;
$R^5$ is phenylene which can be substituted by 1 or 2 substituents from the group consisting of chlorine, sulfo, methyl, ethyl, methoxy, ethoxy and carboxy, or is alkylene of 2 to 6 carbon atoms, preferably of 2 to 4 carbon atoms, such as ethylene and propylene, or is a group of the formula ALK-O-ALK, ALK-NH-ALK, Phen-O-ALK, and ALK-O-Phen, Phen-NH-ALK , ALK-NH-Phen , Phen-ALK and ALK-Phen, in which ALK is an alkylene of 1 to 4 carbon atoms, such as methylene, ethylene or propylene, and is unsubstituted or substituted by sulfo, hydroxy, sulfato or acetyloxy, and Phen is phenylene which can be substituted by 1 or 2 substituents from the group consisting of methyl, methoxy, chlorine and sulfo;
Y has one of the abovementioned meanings and is preferably vinyl, β-chloroethyl and especially β-sulfatoethyl;
$Y^1$ has one of the meanings of Y or is β-hydroxyethyl;
$G^1$ is a benzene ring which in addition to the two groups —SO₂—Y where Y is as defined above can be substituted by 1 or 2 substituents from the group consisting of methyl, methoxy, chlorine and sulfo, or is an alkane radical of 2 to 6 carbon atoms or a benzene radical which possesses 1 or 2 methylene groups to which one or two of the groups —SO₂—Y are attached;
G is a covalent bond or a group of the formula (12)

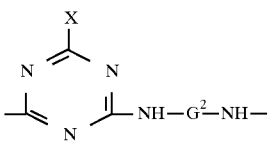

in which
X is as defined above and
$G^2$ is alkylene of 1 to 6 carbon atoms, such as ethylene, n-propylene, isobutylene, isopentylene, hexylene or isohexylene, or is phenylene which can be substituted by 1 or 2 sulfo groups.

Examples of fiber-reactive groups Z are, in particular, vinylsulfonyl, β-sulfatoethylsulfonyl, β-chloroethylsulfonyl, β-acetyloxyethylsulfonyl, β-thiosulfatoethylsulfonyl, β-(β'-sulfatoethylsulfonyl)ethyl, γ-(β'-sulfatoethylsulfonyl)propyl, β-(β'-thiosulfatoethylsulfonyl)ethyl, γ-(β'-thiosulfatoethylsulfonyl)propyl, β-(β'-chloroethylsulfonyl)ethyl, γ-(β'-chloroethylsulfonyl)propyl, β-(vinylsulfonyl)ethyl, γ-(vinylsulfonyl)propyl, N-methyl-N-(β-sulfatoethylsulfonyl)amino, N-ethyl-N-(β-sulfatoethylsulfonyl)amino, β-(β'-sulfatoethylsulfonyl)ethylamino, γ-(β'-chloroethylsulfonyl)propylamino, N-phenyl-N-[β-(β'-chloroethylsulfonyl)ethyl]amino, N-phenyl-N-[β-(β'-sulfatoethylsulfonyl)ethyl]amino, N-phenyl-N-[β-(β'-chloroethylsulfonyl)ethyl]amino, N-phenyl-N-[β-(β'-sulfatoethylsulfonyl)ethyl]amino, N-3"- sulfophenyl-N-[β-(β'-chloroethylsulfonyl)ethyl]amino, N-3"-sulfophenyl-N-[β-(β'-sulfatoethylsulfonyl)ethyl] amino, N-phenyl-N-[y-(β'-chloroethylsulfonyl)propyl] amino, N-phenyl-N-[y-(β'-sulfatoethylsulfonyl)propyl] amino, N-phenyl-N-[y-(β'-chloroethylsulfonyl)propyl] amino, N-phenyl-N-[y-(β'-sulfatoethylsulfonyl)propyl] amino, N-(3"-sulfophenyl)-N-[y-(β'-chloroethylsulfonyl) propyl]amino, N-(3"-sulfophenyl)-N-[y-(β'-sulfatoethylsulfonyl)propyl]amino, β-(β'-sulfatoethylsulfonyl)ethoxyethylamino, 2,4-difluoropyrimidin-6-yl, 5-chloro-2,4-difluoropyrimidin-6-yl, 2,4,5-trichloropyrimidin-6-yl, 5-cyano-2,4-dichloropyrimidin-6-yl, 2-methylsulfonyl-5-chloro-4-methylpyrimidin-6-yl, 2-chloro-4-(3'-sulfophenylamino)-s-triazin-6-yl, 2-chloro-4-(2',5'-disulfophenylamino)-s-triazin-6-yl, 2-fluoro-4-phenylamino-s-triazin-6-yl, 2-fluoro-4-(N-ethyl-N-phenyl)amino-s-triazin-6-yl, 2-fluoro-4-(2'-sulfophenylamino)-s-triazin-6-yl, 2-fluoro-4-(2'-carboxyphenylamino)-s-triazin-6-yl, 2-fluoro-4-(1'-sulfonaphth-2'-yl)amino-s-triazin-6-yl, 2-fluoro-4-(6'-carboxynaphth-2'-yl)amino-s-triazin-6-yl, 2-fluoro-4-morpholino-s-triazin-6-yl, 2-fluoro-4-(β-sulfoethyl)amino-s-triazin-6-yl, 2-fluoro-4-[N-methyl-N-(β-sulfoethyl)] amino-s-triazin-6-yl, 2-fluoro-4-[N-phenyl-N-β-(β'-sulfatoethylsulfonyl)ethyl]amino-s-triazin-6-yl, 2-chloro-4-[N-phenyl-N-y-(β'-sulfatoethylsulfonyl)propyl]amino-s-triazin-6-yl, 2-fluoro-4-[N-ethyl-N-β-(β'-sulfatoethylsulfonyl)ethyl]amino-s-triazin-6-yl, 2-fluoro-4-[y-(β'-sulfatoethylsulfonyl)propyl]amino-s-triazin-6-yl, 2-fluoro-4-(y-vinylsulfonylpropyl)amino-s-triazin-6-yl, 2-fluoro-4-[β-(β'-vinylsulfonylethoxy)ethyl]amino-s-triazin-6-yl, 2-fluoro-4-bis-N,N-[y-(β'-chloroethylsulfonyl) propyl]amino-s-triazin-6-yl, 2-chloro-4-bis-N,N-[β-(β'-chloroethylsulfonyl)ethyl]amino-s-triazin-6-yl, 2-fluoro-4-[4'-(β'-sulfatoethylsulfonyl)phenyl]amino-s-triazin-6-yl, 2-fluoro-4-[2'-methoxy-5'-(β-sulfatoethylsulfonyl)phenyl] amino-s-triazin-6-yl, 2-chloro-4-[4'-(β-sulfatoethylsulfonyl) phenyl]amino-s-triazin-6-yl, 2-chloro-4-[3'-(β-sulfatoethylsulfonyl)phenyl]amino-s-triazin-6-yl, 2-cyanoamino-4-[4'-(β-sulfatoethylsulfonyl)phenyl]amino-s-triazin-6-yl, 2-chloro-4-[N-ethyl-N-(3'-β-sulfatoethylsulfonylphenyl)]amino-s-triazin-6-yl, 2-chloro-4-[β-(4'-β-sulfatoethylsulfonylphenyl)]amino-s-triazin-6-yl, 2-chloro-4-amino-s-triazin-6-yl, 2,3-dichloroquinoxazine-6-carbonyl, 2-fluoro-4-[3'-(2",4"-difluoro-5"-chloropyrimidin-6"-yl)aminosulfophenyl]amino-s-triazin-6-yl, 2-fluoro-4-[3'-(2",4"-difluoropyrimidin-6"-yl) aminophenyl]amino-s-triazin-6-yl, 2-chloro-4-[3'-(2",4"-difluoro-5"-chloropyrimidin-6"-yl)aminosulfophenyl] amino-s-triazin-6-yl, 2-fluoro-4-{3'-[4'''-(2'''-sulfophenyl) amino-2'-fluoro-s-triazin-6"-yl]-sulfophenyl}amino-s-triazin-6-yl, 2-chloro-4-{3'-[4"-(3'''-sulfophenyl)amino-2"-chloro-s-triazin-6"-yl]sulfophenyl}amino-s-triazin-6-yl.

Examples of formula radicals B are 1,2-phenylene, 1,3-phenylene and 1,4-phenylene which can substituted by 1 or 2 substituents from the group consisting of methoxy, ethoxy, methyl, ethyl, chlorine, bromine, fluorine, sulfo and carboxy, or are 1,5-naphthylene or groups of the formulae (aa) to (af)

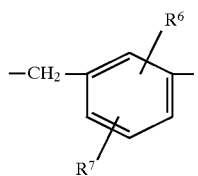
(aa)

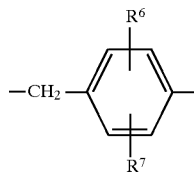
(ab)

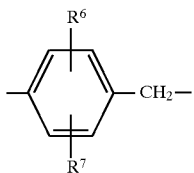
(ac)

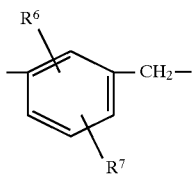
(ad)

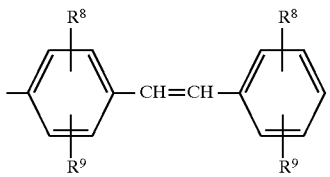
(ae)

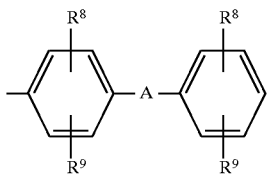
(af)

in which $R^6$ is hydrogen, methoxy, ethoxy, methyl, ethyl, chlorine, sulfo or carboxy, $R^7$ is hydrogen, methoxy, ethoxy, methyl, ethyl or sulfo, $R^8$ is hydrogen, chlorine, methyl or sulfo, $R^9$ has one of the meanings of $R^8$ and is preferably hydrogen, and A is a direct covalent bond or is methylene or ethylene or a group of the formula —CO—, —NH—, —CO—NH— or —NH—CO—.

Examples of such radicals B are, in particular, 1,3-phenylene, 1,4-phenylene, 4-methyl-1,3-phenylene, 2-methyl-1,3-phenylene, 2,5-disulfo-1,3-phenylene, 2,5-disulfo-1,4-phenylene, 4-sulfo-1,3-phenylene, biphenylmethan-4,4'-ylene, 4,4'-biphenylene, 1,3-propylene, 1,6-hexamethylene, 3,3'-dimethoxy-4,4'-biphenylene, 3,3'-dimethyl-4,4'-biphenylene, 3,3'-dichloro-4,4'-biphenylene and 3,3'-disulfo-4,4'-biphenylene.

Examples of azo dye radicals Fb are radicals of the formulae (12A) to (12W)

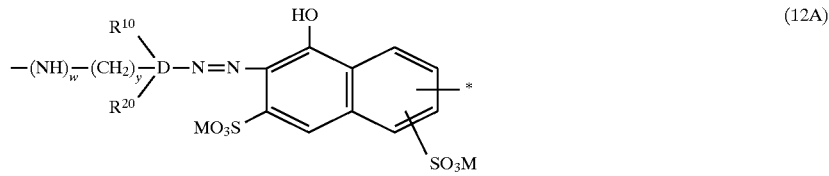
(12A)
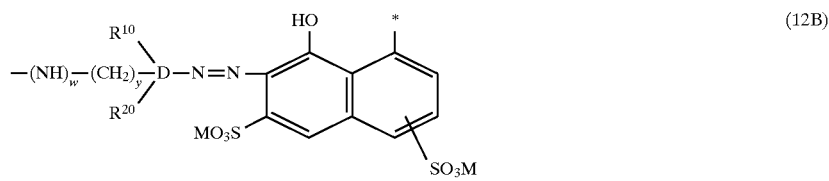
(12B)
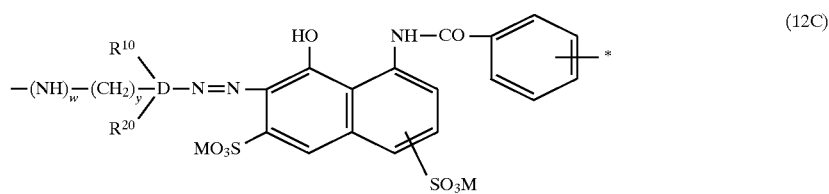
(12C)
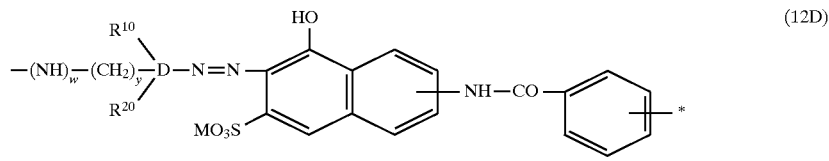
(12D)
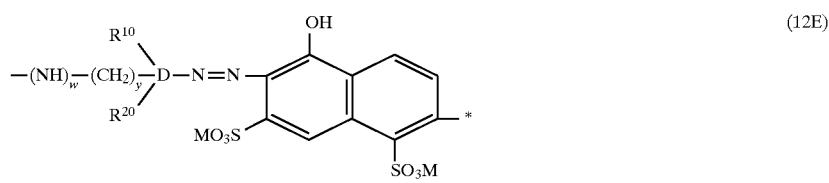
(12E)
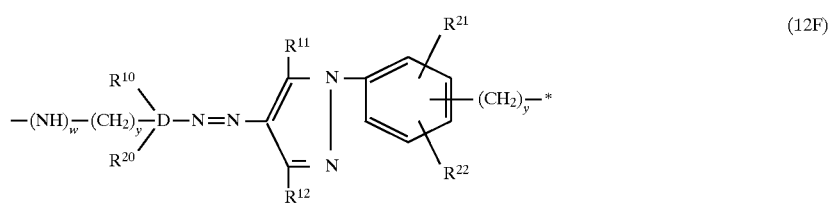
(12F)
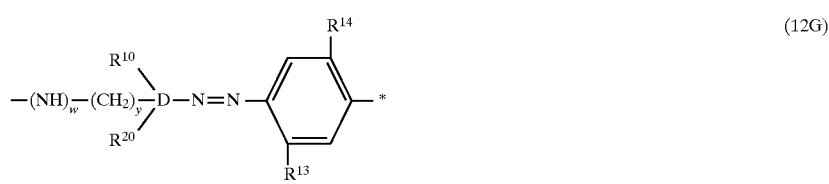
(12G)
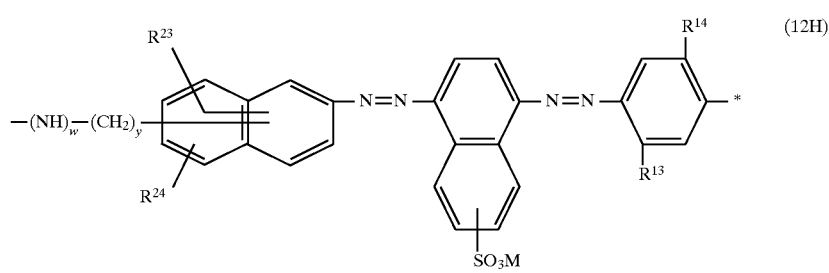
(12H)

-continued
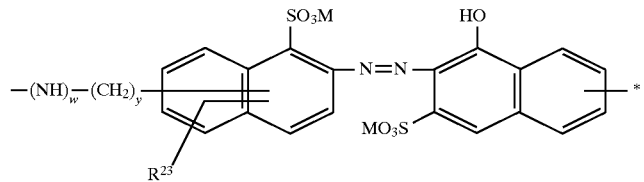 (12Ia)
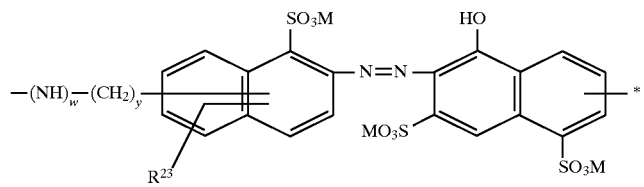 (12Ib)
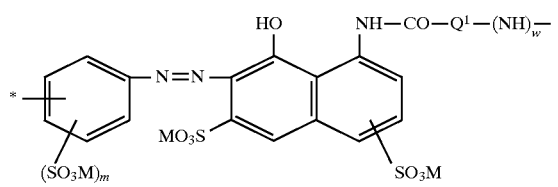 (12J)
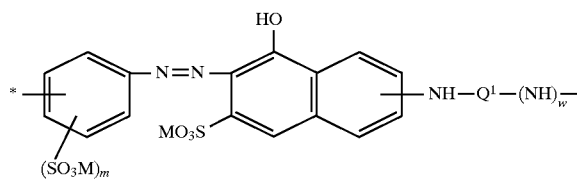 (12K)
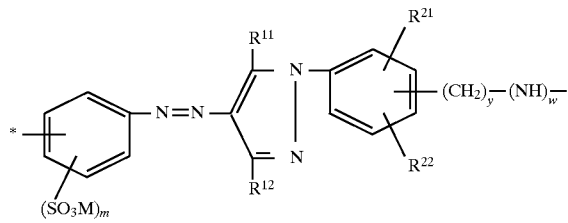 (12L)
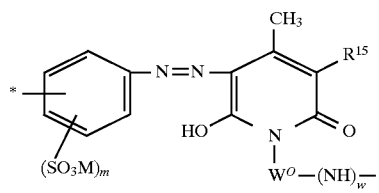 (12M)
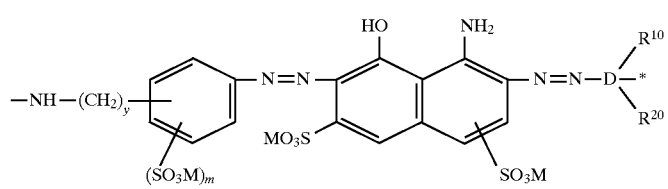 (12N)
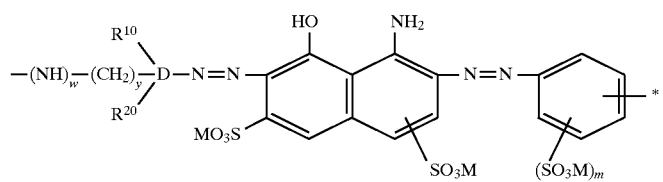 (12P)

-continued

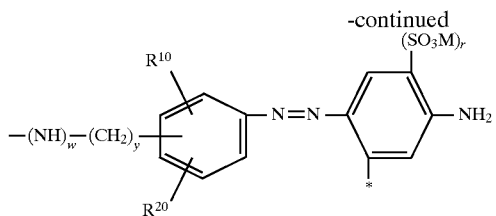
(12Q)

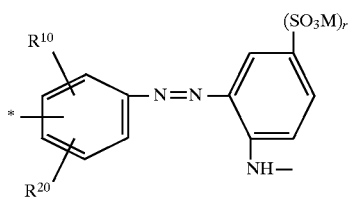
(12R)

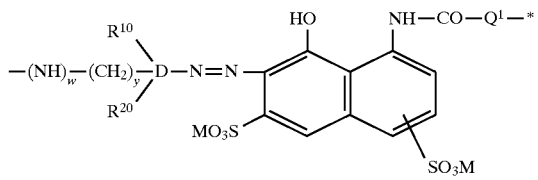
(12S)

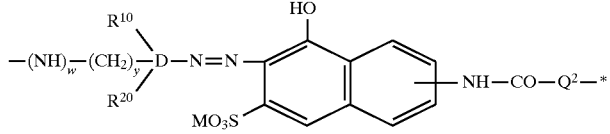
(12T)

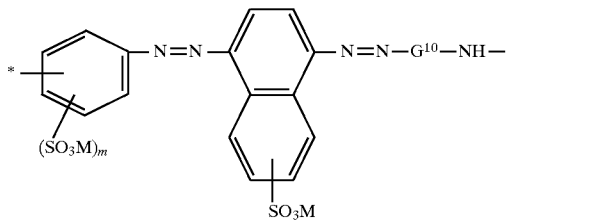
(12U)

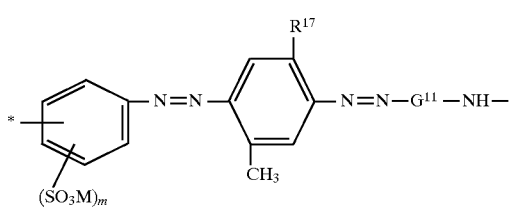
(12V)

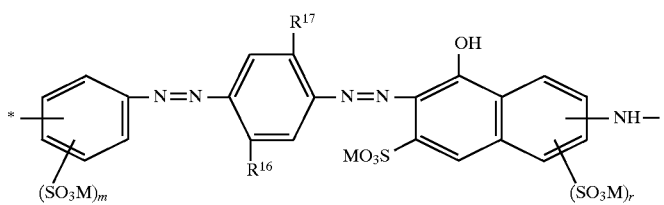
(12W)

in which: M, $W^0$ and y have one of the meanings given above;

r is zero or 1;

w is zero or 1;

D is a benzene ring or is a naphthalene ring in which the azo group is attached preferably in the β position to the naphthalene ring and where, if D is the naphthalene ring, $R^{10}$ and $R^{20}$ are preferably—each independently of the other—a hydrogen atom or a sulfo group;

$R^{10}$ is hydrogen, alkyl of 1 to 4 carbon atoms, such as ethyl and especially methyl, alkoxy of 1 to 4 carbon atoms, such as ethoxy and especially methoxy, halogen, such as chlorine and bromine, carboxy or sulfo and is preferably hydrogen, methyl, methoxy, bromine, chlorine, sulfo or carboxy and with particular preference is hydrogen, methoxy or sulfo;

$R^{20}$ is hydrogen, alkyl of 1 to 4 carbon atoms, such as ethyl and especially methyl, alkoxy of 1 to 4 carbon atoms, such as ethoxy and especially methoxy, halogen, such as chlorine and bromine, nitro, carboxy or sulfo, preferably hydrogen, methyl, methoxy, chlorine, carboxy, sulfo or acetylamino and, with particular preference, hydrogen, methoxy or sulfo;

$R^{11}$ is hydroxy or amino, preferably hydroxy;

$R^{12}$ is methyl, carboxy, carbomethoxy or carboethoxy, preferably methyl or carboxy;

$R^{13}$ is hydrogen or alkyl of 1 to 4 carbon atoms, such as methyl and ethyl, alkoxy of 1 to 4 carbon atoms, such as methoxy and ethoxy, alkanoylamino of 2 to 5 carbon atoms, such as acetylamino and propionylamino, or ureido, preferably hydrogen, methyl, ethyl, methoxy, ethoxy, acetylamino or ureido;

$R^{14}$ is hydrogen, alkyl of 1 to 4 carbon atoms, such as methyl and ethyl, alkoxy of 1 to 4 carbon atoms, such as methoxy and ethoxy, sulfo and halogen, such as bromine and especially chlorine, preferably hydrogen, methyl, ethyl, methoxy, ethoxy or sulfo;

$R^{15}$ is hydrogen, cyano, carbamoyl, sulfamoyl or sulfomethyl, preferably hydrogen or carbamoyl;

$R^{16}$ is acetylamino, propionylamino, ureido, methoxy or methyl;

$R^{17}$ is hydrogen, methoxy or sulfo;

$R^{21}$ has one of the meanings of $R^{10}$;

$R^{22}$ has one of the meanings of $R^{20}$;

$R^{23}$ is hydrogen or sulfo;

$R^{24}$ is hydrogen or sulfo;

$Q^1$ is alkylene of 1 to 4 carbon atoms, such as ethylene and propylene, or is phenylene which is unsubstituted or substituted by sulfo, carboxy and/or alkyl of 1 to 4 carbon atoms, such as methyl;

$Q^2$ is a group of the formula —NH-phen- or -alk-, in which alk is alkylene of 2 to 4 carbon atoms and phen is sulfophenylene or phenylene;

m is zero, 1 or 2 (and if m is zero this group is hydrogen);

$G^{10}$ is a radical of the formula (13a)

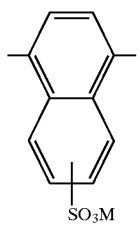

(13a)

where M is as defined above;

$G^{11}$ is a radical of the formula (13b)

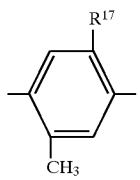

(13b)

where $R^{17}$ is as defined above;

in the compounds of the formulae (12A), (12-Ia), (12K) and (12T) the amino or amido grouping is attached to the naphthol radical in position 2 or 3 on the 8-naphthol radical and in the compounds of the formulae (12B), (12C), (12J), and (12S) one group —SO$_3$M in the naphthol radical is attached meta or para to the amino or acylamino group;

the free bond, labelled with an *, is attached to the nitrogen atom of a urea group in accordance with formula (1).

Dye radicals $Z^1$-Fb- and, respectively, $Z^2$-Fb- are, in particular, radicals of the formulae (12 AA) to (12 AP)

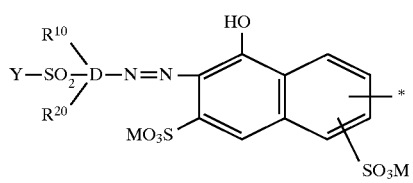

(12AA)

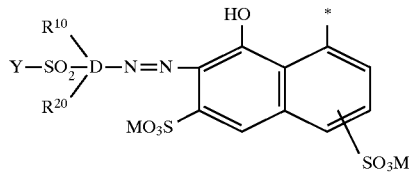

(12AB)

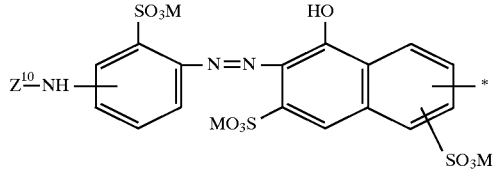

(12AC)

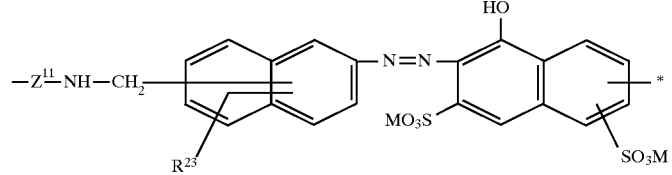

(12AD)

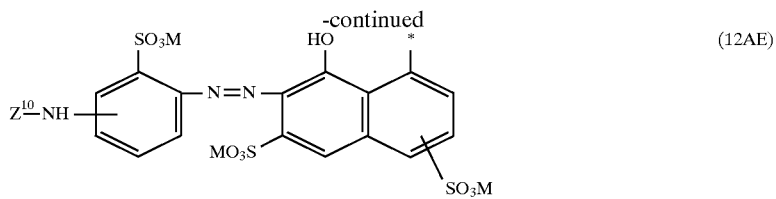
(12AE)
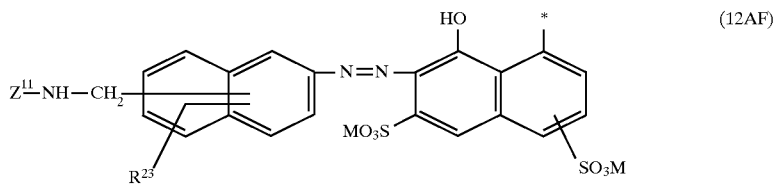
(12AF)
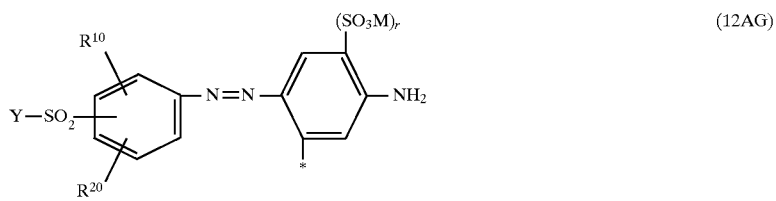
(12AG)
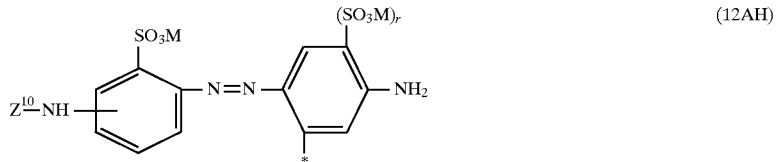
(12AH)
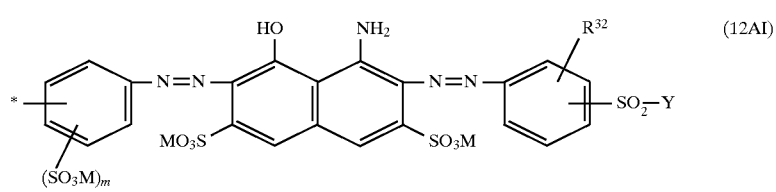
(12AI)
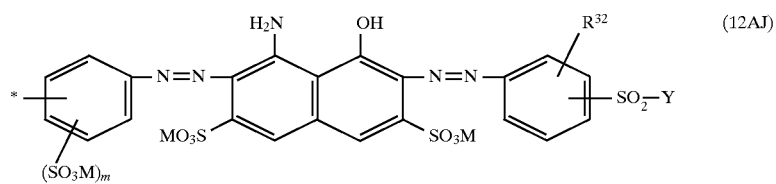
(12AJ)
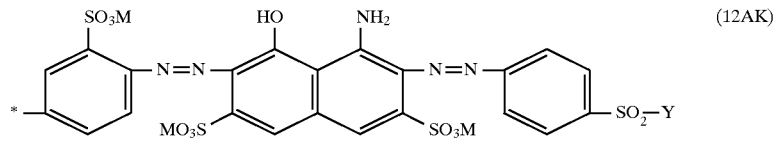
(12AK)
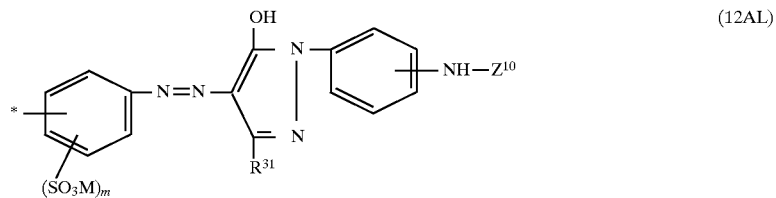
(12AL)
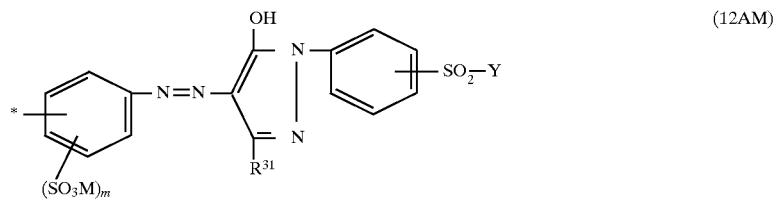
(12AM)

(12AN)

(12AO)

(12AP)

in which:

M, $R^{10}$, $R^{20}$, $R^{23}$ and r are as defined above;

Y has one of the above meanings, especially the preferred meaning;

n is 1 or 2;

$R^{30}$ is hydrogen, methyl or methoxy;

$R^{31}$ is methyl or carboxy;

$R^{32}$ is hydrogen, methoxy or sulfo;

$Z^{10}$ is one of the above groups of the formulae (11a) to (11h);

$Z^{11}$ is a group of the formula (11h) defined and specified above;

the tree bond, labelled with *, is attached to the nitrogen atom of a urea group in accordance with formula (1).

The present invention additionally relates to processes for preparing the dyes of the formula (1) defined and specified above. These processes comprise reacting a diisocyanate of the formula (20)

$$OCN—B—NCO \qquad (20)$$

in which B is as defined above with twice the molar amount of one or two compounds of the formula (21)

$$Z—Fb—N(R)H \qquad (21)$$

in which Z has one of the above meanings of $Z^1$ or $Z^2$ and Fb and R are as defined above, where when using two different compounds (21) the radicals Z, Fb and R can in each case have different meanings, or comprise reacting a diisocyanate of the formula (20) defined and specified above with twice the molar amount of one or two compounds of the formula (22)

$$H—Fb—N(R)H \qquad (22)$$

in which Fb and R are as defined above, where when using two different compounds (22) the radicals Fb and R can possess meanings which are the same as or different from one another, and reacting the resulting compound of the formula (23)

$$\begin{array}{cc} H—Fb—N(R) & N(R)—Fb—H \\ | & | \\ CO & CO \\ | & | \\ NH—B—NH \end{array} \qquad (23)$$

in which Fb, R and B are as defined above with twice the molar amount of one or two compounds of the formula (24)

$$Hal—Z \qquad (24)$$

in which Hal is halogen, such as bromine or preferably chlorine or fluorine, and Z has one of the meanings of $Z^1$ or $Z^2$ and is preferably the radical of a heterocyclic fiber-reactive group, where when using two different compounds (24) the radicals Hal and Z can in each case have different meanings, or comprise coupling a compound of the formula (25)

$$\begin{array}{cc} H—K^2—N(R) & N(R)—K^2—H \\ | & | \\ CO & CO \\ | & | \\ NH—B—NH \end{array} \qquad (25)$$

in which B and R are as defined above and $K^2$ is the radical of a coupling component of the aniline, aminonaphthalene, diaminobenzene, acetoacet(aminoaryl)amide, 1-(aminophenyl)pyrazolone or 1-(aminonaphthyl)pyrazolone series, where R and $K^2$ can in each case have meanings which are the same as or different from one another, to twice the molar amount of one or two diazo components which are selected from the compounds of the formulae $Z^1$—$D^1$—$NH_2$ and $Z^2$—(NR)—$D^2$—$NH_2$, in which R, $Z^1$, $Z^2$, $D^1$ and $D^2$ are as defined above and in the case where two diazo components are employed may in each case possess meanings which are identical to or different from one another, or comprise reacting a compound of the formula (26) which is obtainable by coupling a compound of the formula (25) defined and specified above to twice the molar amount of one or two compounds of the formula H(R)N—D²—NH₂, in which compound of the formula (26)

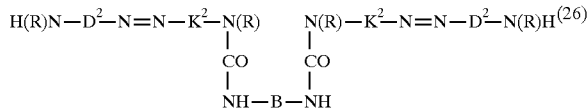

K², R, B and D² are as defined above, with twice the molar amount of one or two compounds of the formula (24) defined and specified above, or comprise diazotizing a compound of the formula (27) obtainable by reacting a diisocyanate compound of the formula (20) with twice the molar amount of one or two compounds of the formula H₂N—D²—N(R²)H, in which compound of the formula (27)

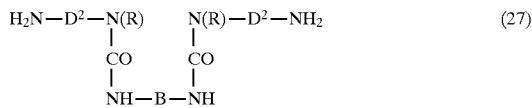

B, R and D² are as defined above and where D² and R can in each case have identical or different meaning, and coupling the diazotization product to twice the molar amount of one or two coupling components which are selected from the compounds of the formulae Z¹—K¹—H and Z²—N(R)—K²—K—H, in which R, Z¹, Z², K¹ and K² are as defined above and if two such coupling components are employed can in each case possess meanings which are identical to or different from one another, or comprise reacting a compound of the formula (28)

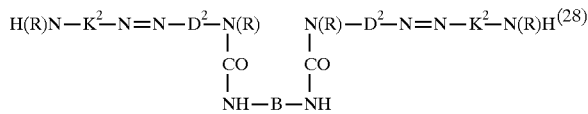

obtainable by coupling a diazotized compound of the formula (27) defined and specified above to twice the molar amount of one or two coupling components of the formula H—K²—N(R)H, in which compound of the formula (28) B, R, D² and K² are as defined above, with twice the molar amount of one or two compounds of the formula (24) in which Hal and Z are as defined above and Z is preferably the radical of a heterocyclic fiber-reactive group.

The reaction of the diisocyanates of the formula (20) with the compounds of the formulae (21), (22) and (25) takes place in a manner conventional per se, for example, in an aqueous or aqueous-organic medium in suspension or solution at a pH of between 3 and 10, preferably between 5 and 7, and at a temperature of between 0° and 80° C., preferably between 20° and 50° C. Where the reactions are conducted in an aqueous-organic medium the organic medium is an isocyanate-inert solvent such as dimethylacetamide, dimethyl sulfoxide or N-methylpyrrolidone, for example.

Similar considerations apply to the reactions of amino-containing compounds with a compound of the formula (24), which can likewise take place in an aqueous or aqueous-organic medium and are conducted under customary process conditions, such as at a temperature of between −5° C. and +95° C. and at a pH of between 2 and 10, and when Hal is chlorine generally at a temperature of between 0° and 95° C., preferably between 15° and 60° C., and at a pH of between 2 and 10, preferably between 4 and 7, and when Hal is fluorine at a temperature of between 0° and 40° C., preferably between 5 and 25° C., and at a pH of between 3 and 9, preferably between 4 and 7.

Where the synthesis according to the invention of the dyes of the formula (1) takes place by means of a diazotization and coupling step, this step is likewise carried out in a manner conventional per se, i.e the diazotization generally by means of nitrous acid at a pH of beneath 2 and at a temperature of between −10° C. and +10° C. and the coupling reaction at a temperature of between 0° and 40° C., preferably between 10° and 25° C. and, depending on the coupling component, in an acidic, weakly acidic or neutral or weakly alkaline range, such as at a pH of between 1 and 10 and, in the case of an amino-containing component, at a pH of between 1 and 4 and, in the case of a hydroxy-containing coupling component, at a pH of between 4 and 8.

The isolation of the dyes of the formula (1)—referred to below as dyes (1)— prepared in accordance with the invention, from the synthesis batches takes place in accordance with methods which are common knowledge, either by precipitation from the reaction medium by means of electrolytes such as sodium chloride or potassium chloride, for example, or by evaporative concentration of the reaction solution, by means, for example, of spray drying, it being possible to supply a buffer substance to this synthesis solution.

The dyes (1) possess very good dye properties. They can therefore be used for the dyeing (including the printing) of hydroxy- and/or carboxamido-containing material, especially fiber material. In particular, the dyes of the invention are highly suitable for printing textiles. In addition, the solutions obtained in the course of the synthesis of the dyes (1) of the invention can be used directly—possibly after addition of a buffer substance and possibly after concentration—as a liquid preparation for dyeing. The dyes (1) are notable for high fiber reactivity, and the dyeings obtained with them have good wet and light fastness properties. Particularly worthy of emphasis is their high degree of fixation on the material to be dyed.

The present invention therefore also provides for the use of the dyes (1) for dyeing hydroxy- and carboxamido-containing materials, and provides methods for their application to these substrates. Included in this context are mass coloring, for example of polyamide films, and printing processes. The materials are preferably employed in the form of fiber materials, especially as textile fiber materials, as in the form of wovens or as yarns, as in the form of hanks and packages. In this context the dyes (1) are generally employed in accordance with known dyeing and printing methods which are employed in particular for fiber-reactive dyes, the dyes being fixed under the action of heat or by means of an alkali or by means of both measures.

Hydroxy-containing materials include natural or synthetic hydroxy-containing materials, for example cellulose fiber materials or regenerated products thereof and polyvinyl alcohols. Cellulose fiber materials are preferably cotton, but also other vegetable fibers, such as linen, hemp, jute and ramie fibers; regenerated cellulose fibers are, for example, staple viscose and filament viscose.

Carboxamido-containing materials are, for example, synthetic and natural polyamides and polyurethanes, especially in the form of fibers, for example wool and other animal hairs, silk, leather, nylon-6,6, nylon-6, nylon-11 and nylon-4 and other superpolyamides.

The dyes (1) can as already mentioned be applied to and fixed on the abovementioned substrates, especially the fiber materials mentioned, by the techniques known for water-soluble dyes, especially for fiber-reactive dyes.

Thus the customary printing processes for cellulose fibers, which can either be carried out in one phase, for example by printing with a printing paste comprising sodium carbonate or another acid-binding agent and the dye (1) and by subsequent steam treatment at from 100° to 103° C., or in two phases, for example by printing with a neutral or weakly acidic printing paste comprising the colorant and then fixing, either by passing the printed goods through a hot, electrolyte-containing, alkaline bath or by overpadding with an alkaline, electrolyte-containing padding liquor and subsequent batching of this treated material or subsequent steam treatment or subsequent treatment by means of dry heat, strongly colored prints with well-defined out-lines and a clear white ground are obtained. The printing outcome is not very dependent on changing conditions of fixing. The degrees of fixation obtained with the dyes (1) are very high.

In the case of fixing by means of dry heat in accordance with the customary thermofixing technique use is made of hot air at from 120° to 200° C. In addition to the customary use of steam at from 101° to 103° C., it is also possible to make use of superheated steam and pressurized steam at temperatures of up to 160° C.

The products which bind acid and which bring about the fixing of the dyes (1) on the cellulose fibers are, for example, water-soluble basic salts of the alkali metals and of the alkaline earth metals of organic or inorganic acids, and also compounds which release alkali when heated. Particular mention should be made of the alkali metal hydroxides and alkali metal salts of weak to moderately strong organic and inorganic acids, the alkali metal compounds preferably being the sodium and potassium compounds. Examples of such acid-binding products are sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass or trisodium phosphate.

Treatment of the dyes (1) with the acid-binding products, with or without the action of heat, binds the dyes chemically to the cellulose fibers; dyeings on cellulose in particular show excellent wet fastness properties following the customary aftertreatment rinse to remove unfixed portions of the dyes (1), especially since such unfixed portions can easily be washed off owing to their good solubility in cold water.

Dyeings on polyurethane and polyamide fibers are usually carried out from an acidic medium. For example, acetic acid and/or ammonium sulfate and/or acetic acid and ammonium acetate or sodium acetate can be added to the dyebath in order to give the desired pH. In order to obtain a suitably level dyeing it is advisable to add customary levelling assistants, based for example on a reaction product of cyanuric chloride with three times the molar amount of an aminobenzenesulfonic and/or aminonaphthalenesulfonic acid or on a reaction product of ethylene oxide with stearylamine, for example. In general, the material to be dyed is introduced into the dyebath, which is at from about 20° to 40° C., is agitated therein for a certain time, then the dyebath is adjusted to the desired weakly acidic pH, preferably with acetic acid, and actual dyeing is carried out at a temperature of between 60° and 98° C. Alternatively, dyeing can be carried out at boiling point or at temperatures of up to 120° C. (under pressure).

The dyeings and prints produced with the dyes (1) feature clear shades. The dyeings and prints on the cellulose fiber materials in particular, as already mentioned, also display high color strength, good lightfastness and very good wet fastness properties, such as fastnesses to washing, drumming, water, saltwater, cross-dyeing and perspiration, and also good fastness to dry heat setting, to ironing and to rubbing. The dyes (1) are readily dischargeable and the dyeings of the invention may therefore be used as a readily dischargeable ground in discharge printing under the conditions, for example, of alkaline or reductive discharge in vat discharge printing.

The high fixing yields which can be achieved with the dyes of the invention on cellulose fiber materials are deserving of particular mention. A further advantage of the dyes (1) is the ease of washoff of the portions which are not fixed in the course of printing or dyeing, and as a result of which the operation of washing of the printed or dyed cellulose fiber materials can be carried out with small amounts of washing liquor and, if appropriate, with an energy-saving temperature regime during the washing operation. In addition, the dyes (1) lend themselves very well to dyeing processes which are carried out with small amounts of salt, such as sodium sulfate and sodium chloride, these amounts being, for example, less than 40 g per liter of dyeing liquor. Here too, strongly colored dyeings of high quality are obtained.

The Examples which follow serve to illustrate the invention. The parts are parts by weight and the percentages are percentages by weight, unless stated otherwise. The relationship between parts by weight and parts by volume is that of the kilogram to the liter.

The compounds described by way of formulae in the Examples are indicated in the form of the free acid; in general they are prepared and isolated in the form of their alkali metal salts, such as lithium, sodium or potassium salts, and are used for dyeing in the form of their salts. Similarly, the starting compounds and components given in the form of the free acid in the subsequent Examples, especially the Tabular Examples, can be employed in the synthesis as they are or in the form of their salts, preferably alkali metal salts.

The absorption maxima ($\lambda_{max}$) in the visible range which are indicated for the dyes of the invention were determined on the basis of aqueous solutions of their alkali metal salts. In the Tabular Examples the $\lambda_{max}$ values are put in brackets when the hue is indicated; the wavelength indicated is in nm.

EXAMPLE 1 a) 0.5 mol of tolylene 2,4-diisocyanate is introduced slowly into a solution of 1 mol of 1-amino-8-hydroxynaphthalene-3,6-disulfonic acid in 3000 ml of water while maintaining a pH of from 6 to 7 and a temperature of 22° to 30° C. Stirring is continued for a short time until the reaction is at an end, the batch is cooled to 10° to 15° C., stirring is continued for about an hour, and the precipitated crystalline product of the formula

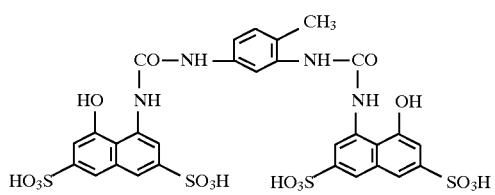

is isolated as alkali metal salt (sodium salt).

b) 0.1 mol of 4-(β-sulfatoethylsulfonyl)aniline is diazotized in a customary manner in 500 ml of water and 0.25 mol of hydrochloric acid, using 0.11 mol of sodium nitrite, at from 0° to 5° C., and the resulting diazonium salt suspension is stirred into 1000 ml of an aqueous solution of 0.05 mol of the compound prepared in section a) while maintaining a pH of from 5 to 6 and a temperature of 15° to 20° C., and the coupling reaction is completed at about 22° C. and at a pH of from 6 to 6.5.

The novel dye of the formula (written in the form of the free acid)

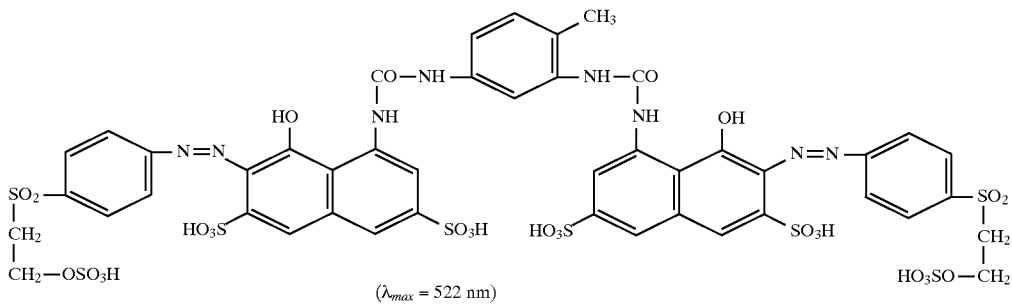

($\lambda_{max}$ = 522 nm)

is isolated in a customary manner as an alkali metal salt, such as the sodium or potassium salt, for example by salting it out with potassium chloride or by spray drying. When employed by the methods customary in the art for fiber-reactive dyes it dyes the fiber materials specified in the description, such as cotton, in strong red, fast hues. The dyeings produced therewith are, advantageously, particularly easy to discharge by means of alkalis or reductively; the dyeings obtainable therewith are therefore of outstanding suitability as discharge grounds, for example in connection with the use of vat discharge printing. The dye is likewise very suitable for use in cold pad-batch dyeing processes and in the ecologically advantageous exhaust processes which operate with only a low electrolyte salt content (low-salt exhaust dyeing processes).

EXAMPLE 2 a) 0.5 mol of diphenylmethane 4,4'-diisocyanate is added slowly to a solution of 1 mol of 1-amino-8-hydroxynaphthalene-3,6-disulfonic acid in 4500 ml of water, while maintaining a pH of from 5 to 6 and a temperature of 30° to 35° C., and the batch is stirred at this temperature until the reaction is at an end, then cooled to 15° to 20° C. and stirred again for about an hour, and the product of the formula

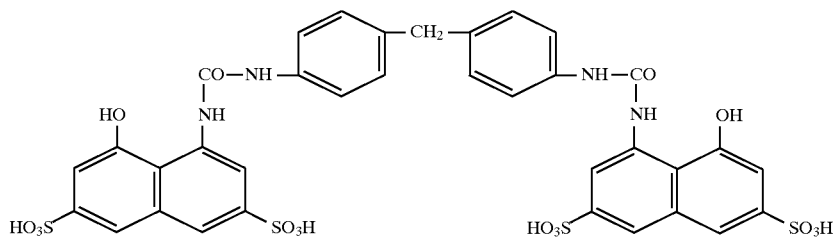

which has crystallized out is isolated as an alkali metal salt.

b) A diazonium salt suspension prepared in accordance with Example 1a) is stirred, while maintaining a pH of between 5.5 and 6.5 and a temperature of 15° to 20° C., into 1200 ml of an aqueous solution of 0.05 mol of the starting compound prepared in accordance with section b), and the coupling reaction is completed at this temperature and at a pH of between 5 and 6. The novel dye of the formula (written in the form of the free acid)

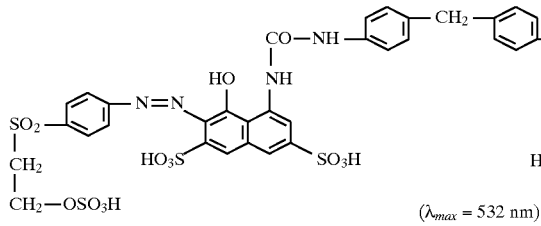
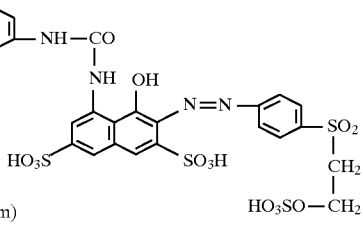

($\lambda_{max}$ = 532 nm)

is isolated from the synthesis solution in a customary manner, for example by salting it out with sodium chloride or by spray drying, as an alkali metal salt (sodium salt). When employed by the methods customary for fiber-reactive dyes it dyes cotton, for example, in strong red shades having good fastness properties; the dyeings produced therewith can be very readily discharged by means of alkalis or reductively, and are therefore outstandingly suitable as grounds in vat discharge printing. In addition, the novel dye is highly suited to the cold pad-batch dyeing process and the low-salt exhaust dyeing process.

EXAMPLE 3

0.1 mol of the known compound 3-(2',4'-difluoropyrimidin-6'-yl)amino-6-sulfoaniline are diazotized in a customary manner at from 0° to 5° C. in 400 ml of water and 0.22 mol of hydrochloric acid by means of 0.11 mol of sodium nitrite. The resulting diazonium salt suspension is added, while maintaining a pH of from 5.5 to 6.5 and a temperature of 15° to 20° C., to 850 ml of an aqueous solution of 0.05 mol of the starting compound obtained in the accordance with Example 1a), and the coupling reaction is completed over a certain period, with slow heating at from 20° to 25° C. and a pH of from 5 to 6 in order to complete the coupling reaction.

The novel dye (written in the form of the free acid)

materials specified in the description, such as cotton, in strong red and fast shades and is therefore particularly suitable for the low-salt exhaust dyeing process and the cold pad-batch dyeing process.

EXAMPLE 4 a) 0.11 mol of cyanuric fluoride is added with thorough stirring and at from 0° to 3° C. to a solution of 0.1 mol of the sodium salt of 2-sulfoaniline and 0.1 mol of sodium fluoride in 300 ml of water, and the batch is stirred for about 15 minutes more while maintaining a pH of from 3 to 4, then a solution of 0.1 mol of 2,4-diaminobenzenesulfonic acid in 400 ml of a mixture of water and ice is added, while maintaining a pH of 6, and the batch is stirred under these reaction conditions until it has reacted to form the monofluorotriazine compound. This compound is diazotized in a customary manner, following the addition of hydrochloric acid, by means of 0.11 mol of sodium nitrite at a temperature of from 0° to 5° C. and at a pH of from 1.5 to 2.

b) The diazonium salt suspension prepared in accordance with a) is added slowly, with stirring and maintenance of a pH of from 5.5 to 6.5 and a temperature of from 15° to 20° C., to 850 ml of an aqueous solution of 0.05 mol of the starting compound prepared in accordance with Example 1a), and the coupling reaction is completed at from 20° to 25° C. and at a pH of from 5 to 6.

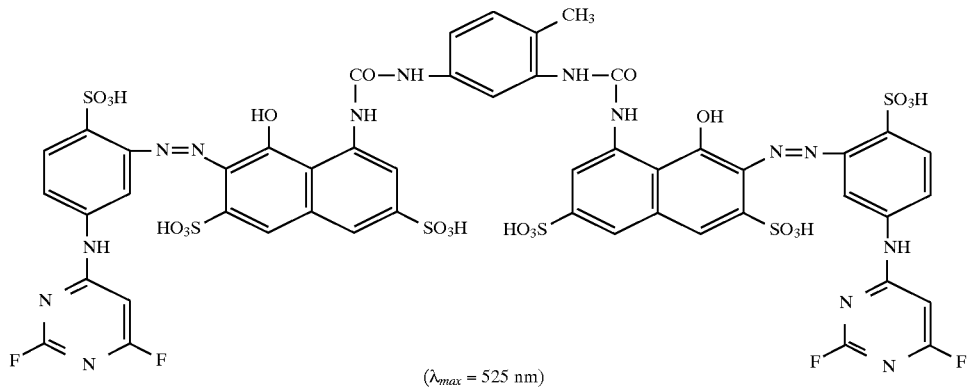

($\lambda_{max}$ = 525 nm)

is isolated in a customary manner. When employed by the customary dyeing and printing methods it dyes the fiber The novel dye (written in the form of the free acid)

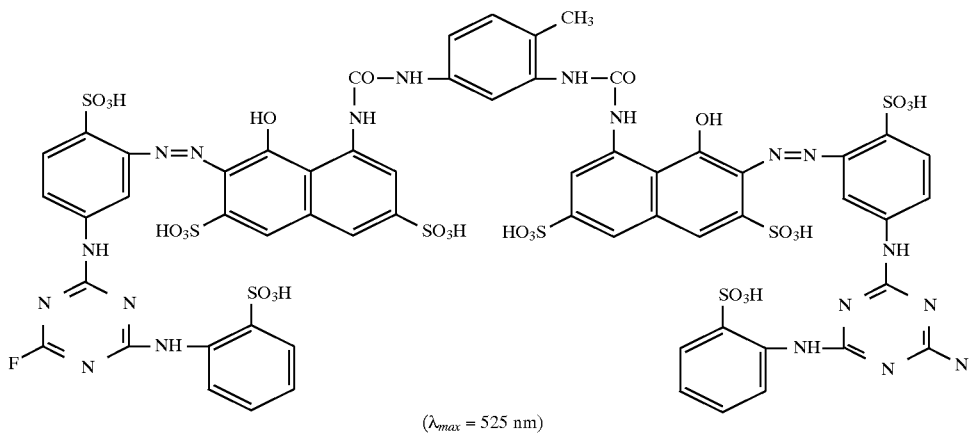

($\lambda_{max}$ = 525 nm)

is isolated in a customary manner, for example by salting it out with sodium chloride or spray drying, and dyes cotton, for example, in strong red, fast shades, and to particular advantage in low-salt exhaust dyeing processes and cold pad-batch dyeing processes.

EXAMPLE 5 a) 0.5 mol of tolylene 2,4-diisocyanate is added slowly to a solution of 1 mol of 2,4-diaminobenzenesulfonic acid in 4000 ml of water, while maintaining a pH of about 6 and a temperature of 25° to 30° C., the batch is stirred until reaction is complete, cooled to 15° to 20° C. and stirred for a further hour and the compound of the formula (written in the form of the free acid)

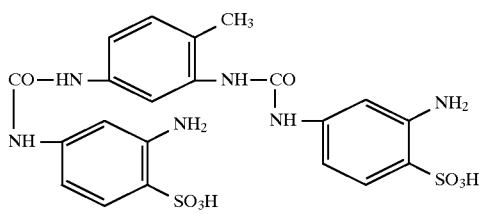

is isolated as an alkali metal salt (sodium salt) by salting it out with sodium chloride.

b) 0.1 mol of the starting compound prepared in accordance with a), containing urea groups, is diazotized in a customary manner at from 0° to 50° C. by means of 0.22 mol of sodium nitrite, in a mixture of 500 ml of water and 0.5 mol of hydrochloric acid, and the resulting diazonium salt suspension is stirred, while maintaining a pH of 5.5 to 6.5 and a temperature of 15° to 20° C., into a solution of 0.2 mol of 1-(4'-morpholino-2'-fluoro-1',3',5'-triazin-6'-yl)amino-8-hydroxy-3,6-disulfonic acid (obtainable in accordance with EP-A-0 542 082) in 1200 ml of water. Stirring is continued for a while in order to complete the coupling reaction at from 22° to 25° C. and a pH of from 5 to 6.

The synthesized dye of the invention possesses the formula, written in the form of the free acid,

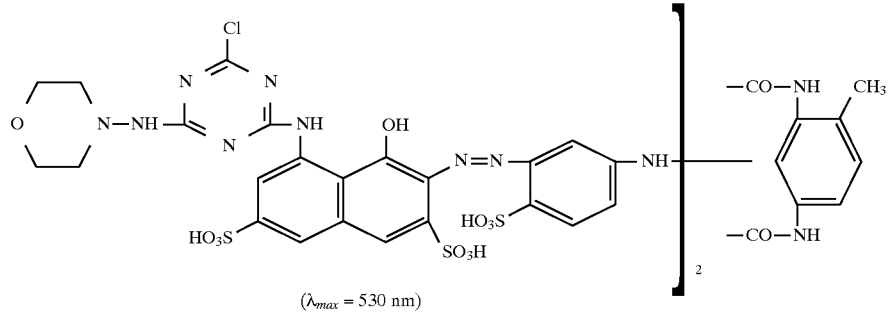

($\lambda_{max}$ = 530 nm)

and dyes, for example, the fiber materials specified in the description, such as cellulose fiber materials, for example cotton, in strong red shades with good fastness properties and a high fixation rate even in deep shades. It lends itself very well to use in the low-salt exhaust dyeing process and in the cold pad-batch dyeing process.

EXAMPLE 6

A disazo dye of the invention is prepared by the procedure of Example 5 but using, instead of the coupling component employed therein, the equivalent amount of 1-[4'-(4''-sulfophenyl)amino-2'-chloro-s-triazin-6'-yl]amino-8-hydroxy-3,6-disulfonic acid.

The novel dye, written in the form of the free acid, has the formula

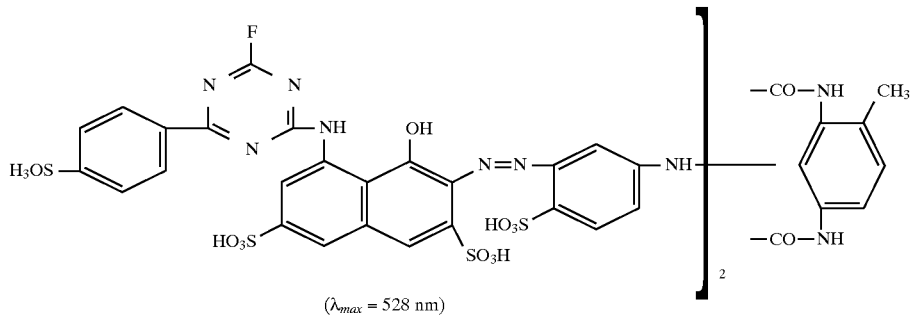

(λ_max = 528 nm)

and dyes cotton, for example, in strong red shades with high fixation rates even in deep shades. It is highly suitable for low-salt exhaust dyeing processes and in the cold pad-batch dyeing processes.

EXAMPLE 7

In accordance with the instructions of Example 5a), tolylene 2,4-diisocyanate is reacted with 2,4-diaminobenzenesulfonic acid, 0.1 mol of the resulting compound is diazotized, and the resulting diazonium suspension is stirred slowly into 1200 ml of an aqueous solution of 0.2 mol of the compound 1-[4'-(3"-sulfophenyl)amino-2'-chloro-s-triazin-6'-yl]amino-8-hydroxy-4,6-disulfonic acid (obtainable in a customary manner by reacting cyanuric chloride with the aminonaphthol and then with the aniline), while maintaining a pH of from 5.5 to 6.5 and a temperature of 15° to 20° C. The coupling reaction is subsequently completed with further stirring at from 22° to 25° C. and at a pH of from 5 to 6.

The resulting dye of the invention, written in the form of the free acid, has the formula and, when employed by the dyeing and printing methods customary in the art for fiber-reactive dyes, gives strong red dyeings and prints having good fastness properties. It is very suitable for low-salt exhaust dyeing processes and cold pad-batch dyeing processes and exhibits a high fixation rate even in the case of dyeings in deep shades.

EXAMPLE 8

The procedure of Example 5b) is repeated but using, instead of the coupling component employed therein, 0.2 mol of the conventionally obtainable compound 1-[4'-(2", 4"-difluoro-5"-chloropyrimidin-6"-yl)aminobenzoyl] amino-8-hydroxy-3,6-disulfonaphthalene.

The novel dye of the formula (written in the form of the free acid)

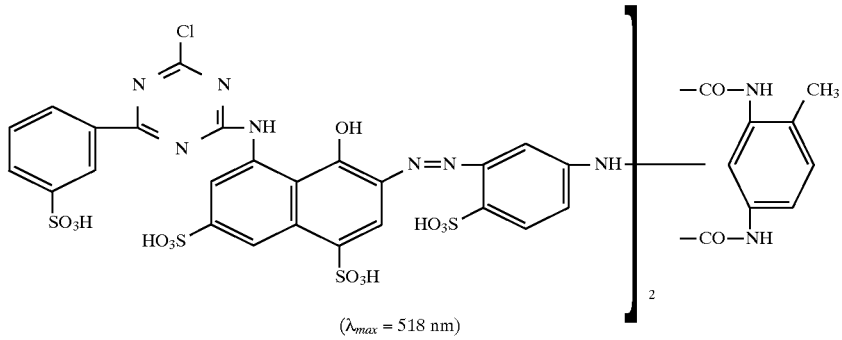

(λ_max = 518 nm)

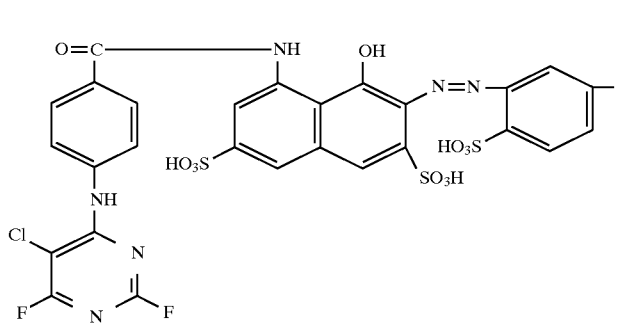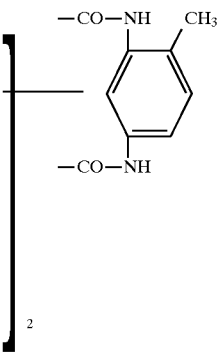

($\lambda_{max}$ = 518 nm)

is obtained in a customary manner from the synthesis solution by salting out with sodium chloride or by spray drying. On materials containing cellulose fiber, for example, such as cotton, it gives strong red dyeings having good fastness properties and a high fixation rate even in deep shades. It is in particular very suitable for the low-salt exhaust dyeing process and for the cold pad-batch dyeing process.

EXAMPLE 9

In accordance with the procedure of Example 5a), 0.5 mol of benzene 1,3-diisocyanate is reacted with 1 mol of 1,4-diamino-2,6-disulfobenzene and then 0.1 mol of the resulting starting compound is diazotized in a customary manner to give the bisdiazonium salt. The bisdiazonium salt suspension obtained is introduced with thorough stirring into a solution of 0.2 mol of 1-{4'-[3"-(β-sulfatoethylsulfonyl) phenyl]amino-2'-chloro-1',3',5'-triazin-6'-yl}amino-8-hydroxy-3,6-disulfonaphthalene in 2000 ml of water, while maintaining a pH of between 5.5 and 6.5 and a temperature of 15° to 20° C., and the coupling reaction is completed at a pH of from 5 to 6 and a temperature of 22° to 25° C.

The novel disazo dye has (written in the form of the free acid) the formula and dyes cotton, for example, in strong shades of high color strength with good fastness properties and with a high fixation rate even in deep shades. It is particularly suitable for the low-salt exhaust dyeing process and for a cold pad-batch dyeing process.

EXAMPLE 10

In accordance with the procedure of Example 5a), 0.5 mol of benzene 1,3-diisocyanate is reacted with 1 mol of 1,3-diaminobenzene-6-sulfonic acid, and 0.1 mol of the resulting compound, containing urea groups, is diazotized in the manner specified therein to give the bisdiazonium salt. The bisdiazonium salt suspension prepared is then introduced with thorough stirring into a solution of 0.2 mol of 1-{4'-[N-phenyl-N-β-(β'-sulfatoethylsulfonyl)ethyl]amino-4'-fluoro-1',3',5'-triazin-6'-yl}amino-8-hydroxy-3,6-disulfonaphthalene (obtainable in accordance with Example 1 of EP-A-0 568 876) in 2000 ml of water with thorough stirring and while maintaining a pH of between 5.5 and 6.5 and a temperature of 15° to 20° C.; the coupling reaction is completed with further stirring at from 22° to 25° C. and a pH of from 5 to 6.

The novel dye thus synthesized has the formula (written in the form of the free acid)

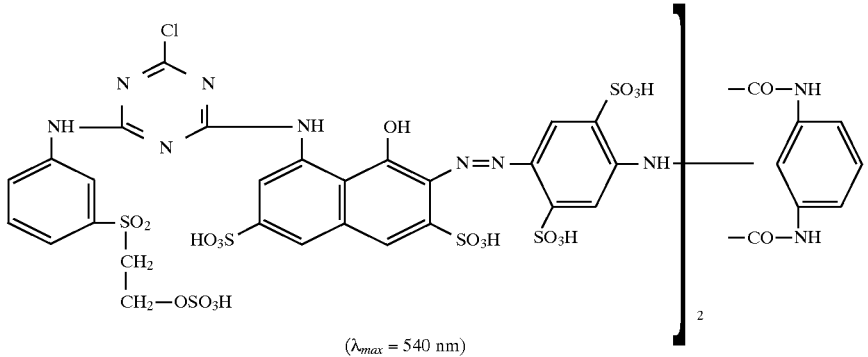

($\lambda_{max}$ = 540 nm)

60

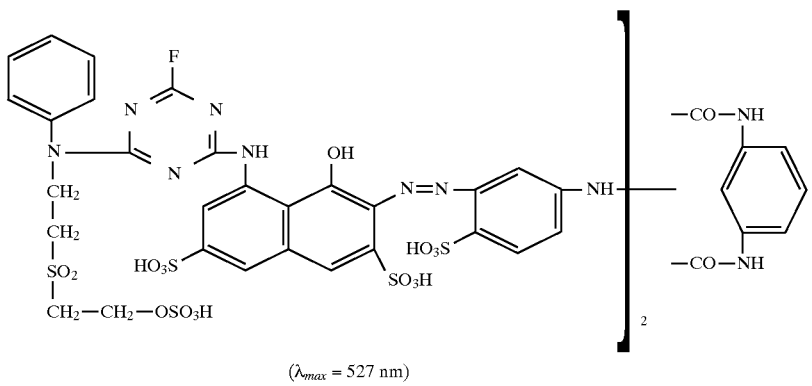

($\lambda_{max}$ = 527 nm)

and dyes cotton, for example, in strong red shades with good fastness properties and at high fixation rates even in deep shades. It is suitable, in particular, for the low-salt exhaust dyeing process and for cold pad-batch dyeing processes.

EXAMPLE 11

A novel tetrakisazo dye is prepared in accordance with the procedure of Example 10 but using, instead of the coupling component employed therein, 0.2 mol of the conventionally obtainable monoazo compound 2-[4'-(β-sulfatoethysulfonyl)phenyl]azo-1-amino-8-hydroxy-3,6-disulfonaphthalene in the coupling reaction.

The synthesized novel dye possesses (written in the form of the free acid) the formula

EXAMPLE 12

To prepare a novel disazo compound, 0.1 mol of the starting compound described in Example 5a), containing urea groups, is diazotized, the resulting bisdiazonium salt suspension is stirred slowly into a solution of 0.2 mol of 1-[4'-(β-sulfatoethysulfonyl)phenyl]-3-methylpyrazol-5-one in 2000 ml of water, while maintaining a pH of from 4 to 5 and at a temperature of 15° to 20° C., and the coupling reaction is completed 20° to 25° C. and within the stated pH range. The resulting novel disazo dye, written in the form of the free acid, has the formula

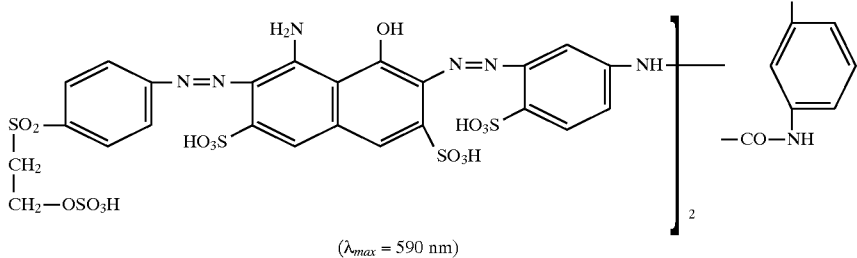

($\lambda_{max}$ = 590 nm)

and can be isolated from the synthesis solution in a customary manner, for example by salting it out with sodium chloride or by spray drying. It dyes the fiber materials specified in the description, such as cotton in particular, in navy to black shades having good fastness properties and in a high fixation rate even in the case of very deep hues. In addition, it is particularly suitable for low-salt exhaust dyeing processes.

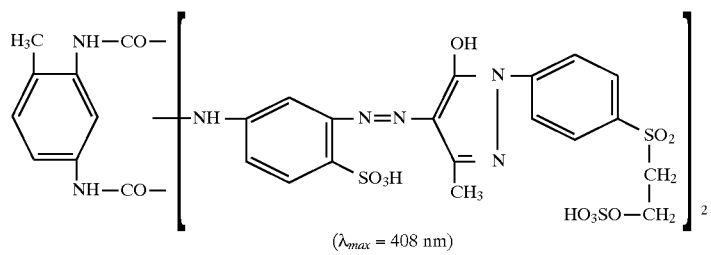

($\lambda_{max}$ = 408 nm)

and can be isolated in a customary manner by salting out or spray drying. It dyes the fiber materials specified in the description, such as cotton, for example, in fast, bright greenish yellow shades and in a high fixation rate. The dye is also highly suitable, moreover, for low-salt exhaust dyeing processes.

EXAMPLE 13

0.5mol of diphenylmethane-4,4'-diisocyanate is reacted with 1 mol of 1,3-diaminobenzene-6-sulfonic acid in accordance with the procedure of Example 2a), and 0.1 mol of the resulting starting compound, containing urea groups, is diazotized to give the bisdiazonium salt. The aqueous suspension, containing hydrochloric acid, of this diazonium salt is stirred slowly into a solution of 0.2 mol of 1-[β-(2',4'-difluoro-5'-chloropyrimidin-6'-yl)aminoethyl]-3-methyl-4-aminocarbonyl-2-hydroxypyrid-2-one in 2000 ml of water, while maintaining a pH of from 5 to 6 and a temperature of 20° to 25° C., and the coupling reaction is completed within this pH and temperature range and with further stirring.

The novel dye of the formula (written in the form of the free acid)

cyanuric fluoride with the lithium salt of the 3-sulfoaniline at about 0° C. and at a pH of between 3 and 4) is stirred into a solution of 0.2 mol of N-(3-aminophenyl)acetoacetamide in 2000 ml of water, while maintaining pH of from 5 to 6 and a temperature of 0° to 5° C., and the reaction is completed within this temperature and pH range.

To the coupling component prepared in this way there is slowly added, with stirring, a diazonium salt suspension prepared in accordance with the instructions of Example 5a), comprising 0.1 mol of the reaction product of tolylene 2,4-diisocyanate and 1,3-diaminobenzene-4-sulfonic acid, with a pH of between 5 and 6 being maintained in the customary manner by addition of acid-binding agent such as an aqueous sodium carbonate solution, for example. The batch is stirred for a while longer at below 25° C. and within this pH range, and the disazo dye of the invention is isolated in a customary manner. Written in the form of the free acid it has the formula

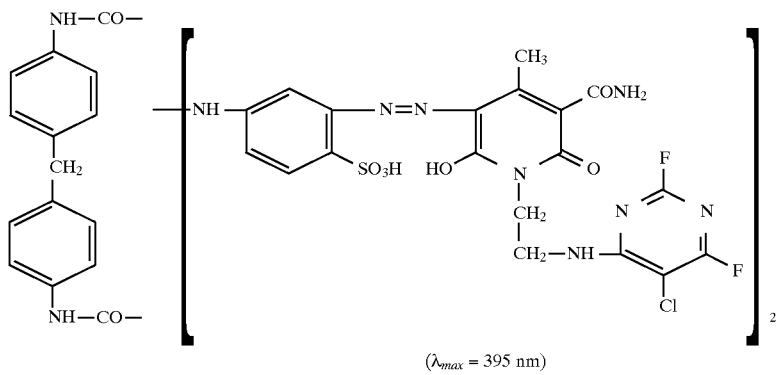

($\lambda_{max}$ = 395 nm)

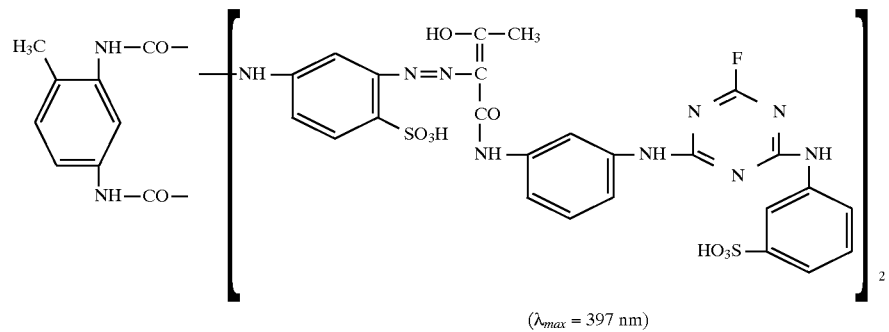

($\lambda_{max}$ = 397 nm)

is isolated in a customary manner and dyes cotton, for example, in bright greenish yellow hues with good fastness properties and a high fixation rate. In particular, the dye is also highly suitable for the low-salt exhaust dyeing process.

EXAMPLE 14

A freshly prepared solution of 0.2 mol of 2,6-difluoro-4-(3'-sulfophenyl)amino-1,3,5-triazine (obtainable by reacting and on cotton, for example, by the dyeing and printing methods customary in the art for fiber-reactive dyes, gives bright greenish yellow dyeings having good fastness properties.

EXAMPLE 15

A freshly prepared, ice-cold aqueous solution of 0.2 mol of 2',6'-difluoro-4'-[N-phenyl-N-β-(β'-sulfatoethylsulfonyl) ethyl]amino-1,3,5-triazine (obtainable in accordance with Example 1 of EP-A-0 568 860) is added to a solution of 0.2 mol of 3-aminophenyl urea in 2000 ml of water, while maintaining a pH of from 5 to 6 and at from 0° to 5° C., and, after the end of the reaction to give the monofluorotriazine compound, there is added to the coupling component thus prepared a diazonium salt suspension prepared in accordance with Example 5 and comprising 0.1 mol of the reaction product of 1,3-benzenediisocyanate and 1,3-diaminobenzene-4-sulfonic acid, this addition taking place slowly and while maintaining a pH of from 5 to 6 and a temperature of from 20° to 25° C. Stirring is continued for a while under these reaction conditions until the end of the coupling reaction, and the novel disazo dye is isolated in a customary manner. Written in the form of the free acid it has the formula

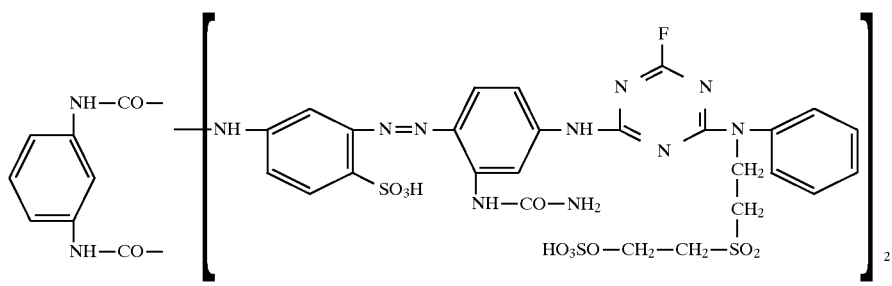

($\lambda_{max}$ = 422 nm)

and dyes cotton, for example, in reddish yellow hues having good fastness properties.

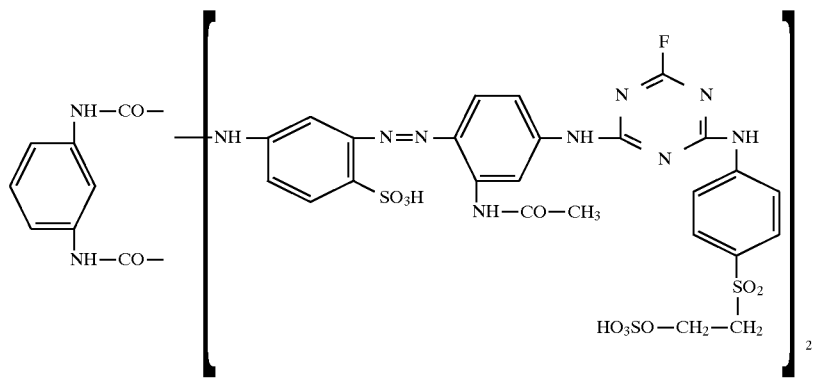

($\lambda_{max}$ = 410 nm)

EXAMPLE 16

To prepare a novel disazo compound, 0.2 mol of 3-aminoacetylaniline is first of all reacted in accordance with the instructions of Example 15, at a pH of from 5 to 6 and a temperature of 0° to 5° C., with 2,6-difluoro-4-[4'-(β-sulfatoethylsulfonyl)phenyl]amino-1,3,5-triazine, then the ice-cold diazonium salt solution of a diamino compound prepared by reacting benzene 1,3-diisocyanate with 1,3-diaminobenzene-4-sulfonic acid is added slowly with stirring to the coupling component thus prepared, while maintaining a pH of from 5 to 6 and a temperature of 15° to 20° C., and the coupling reaction is completed under these reaction conditions and with further stirring. The novel dye has the formula (written in the form of the free acid) and, when employed by the dyeing and printing methods customary in the art for fiber-reactive dyes, dyes the fiber materials specified in the description, such as cotton, for example, in yellow shades having good fastenesses.

EXAMPLE 17

In accordance with the instructions of Example 5a), benzene 1,3-diisocyanate is reacted with 1,3-diaminobenzene-4-sulfonic acid, 0.1 mol of this diamino starting compound containing urea groups is bisdiazotized, the resulting diazonium salt solution is stirred slowly into a solution of 0.2 mol of 1-amino-8-sulfonaphthalene in 1800 ml of water and the coupling reaction is conducted at a pH of from 4 to 5 and a temperature of from 15° to 20° C. The solution of the azo compound obtained is then mixed, while stirring vigorously, with 0.32 mol of 3-(β-chloroethylsulfonyl)aniline in 250 ml of acetone, and the condensation reaction is conducted while maintaining a pH of from 7 to 8 and a temperature of from 40° to 50° C., the β-chloroethylsulfonyl group being converted into a vinylsulfonyl group under these mild alkaline reaction conditions.

The novel dye is isolated from the synthesis solution in a customary manner, for example by salting out, and possesses, written in the form of the free acid, the formula a solution of 0.1 mol of the compound 1,4-bis[(3'-amino-4'-sulfophenyl)ureido]benzene; the coupling reaction takes place at a pH of between 4 and 5 and at a temperature of 10° to 15° C. After the end of the reaction the novel dye of the formula (written in the form of the free acid)

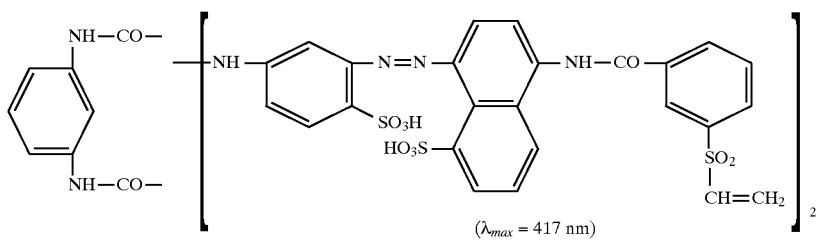

It dyes materials containing cellulose fiber, such as cotton, for example, in reddish yellow shades having good fastness properties.

EXAMPLE 18

A novel disazo dye is prepared in a manner similar to the instructions of Example 17 by reacting the bisdiazonium salt of the compound 1,3-bis-[(3'-amino-4'-sulfophenyl)ureido]benzene with 2 mole-equivalents of 1-amino-8-sulfonaphthalene and reacting the resulting disazo compound with 2 mole-equivalents of 2,3-dichloroquinoxazine-6-carbonyl chloride at a temperature of from 60° to 70° C. and at a pH of from 6 to 7.

The novel dye has the formula (written in the form of the free acid)

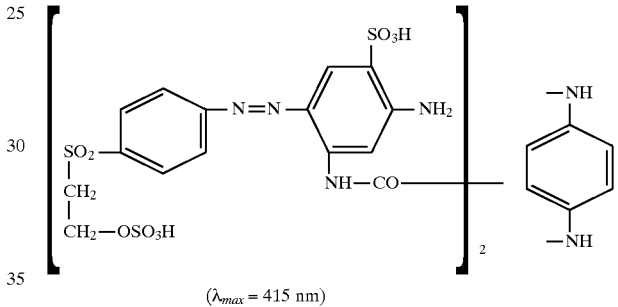

is isolated in a customary manner by salting it out or by spray drying. When employed by the dyeing and printing methods customary for fiber-reactive dyes it dyes the fiber materials specified in the description, such as cotton in particular, in reddish yellow shades having good fastness properties.

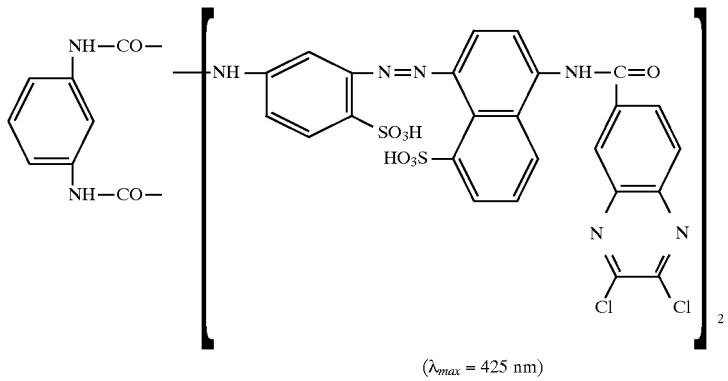

and dyes cotton, for example, in reddish yellow hues having good fastness properties.

EXAMPLE 19

An ice-cold diazonium salt suspension containing hydrochloric acid and prepared in a customary manner, comprising 0.2 mol of 4-(β-sulfatoethylsulfonyl)aniline, is added to

EXAMPLE 20

In a manner similar to the instructions of Example 19, 0.1 mol of the compound 1,3-bis-[(3'-amino-4'-sulfophenyl)ureido]benzene is coupled to the freshly prepared ice-cold diazonium salt suspension of 0.2 mol of 4-(2',4'- difluoropyrimidin-6-yl)-2-sulfoaniline and the coupling reaction is conducted at a pH of between 4 and 5 and at a temperature of from 10° to 15° C.

The novel dyes possesses, written in the form of the free acid, the formula

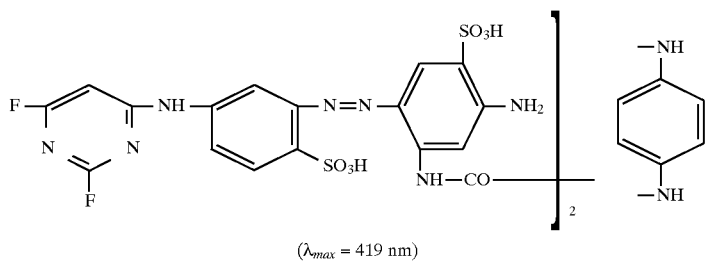

($\lambda_{max}$ = 419 nm)

and dyes cotton, for example, in reddish yellow shades having good fastness properties.

EXAMPLE 21

A freshly prepared, ice-cold diazonium salt suspension of 0.2 mol of 2-sulfo-4-{2'-chloro-4'-[4"-(β-sulfatoethylsulfonyl)phenyl]amino-s-triazin-6'-yl}aminoaniline is added to a solution of 0.1 mol of the compound 1,3-bis[(3'-amino-4'-sulfophenyl)ureido]-4-methylbenzene in 2000 ml of water, with thorough stirring and while maintaining a pH of between 4 and 5 and a temperature of 10° to 15° C., and the coupling reaction is completed within this pH and temperature range. The novel disazo dye of the formula (written in the form of the free acid)

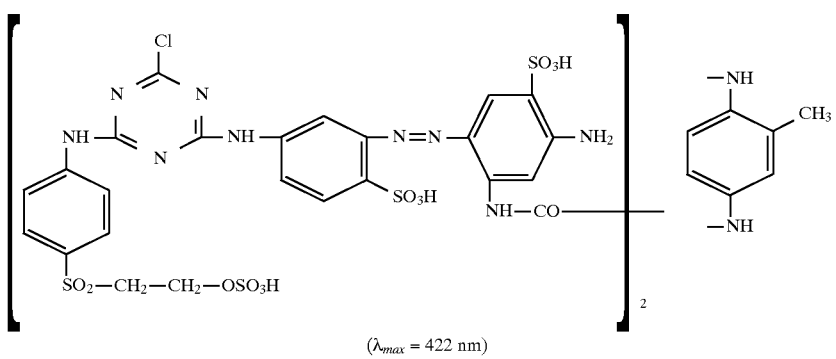

($\lambda_{max}$ = 422 nm)

is isolated in a customary manner. When employed by the dyeing methods customary in the art for fiber-reactive dyes, it dyes the fiber materials specified in the description, such as cotton, in strong reddish yellow, fast hues.

EXAMPLES 22 TO 46

The following Tabular Examples describe further novel dyes of the formula (A)

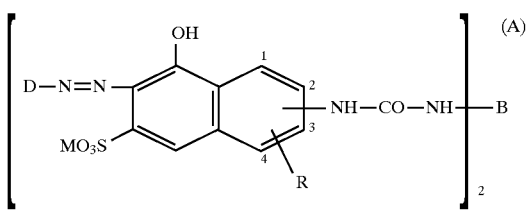

(in which M is as defined in the description) on the basis of the components corresponding to the formula radicals of formula (A). They can be prepared in a manner in accordance with the invention, for example analogously to one of Examples 1 to 5, from the starting compounds which are evident from the formula (A) (such as from the diazo component D—$NH_2$, a sulfoaminonaphthol, a diisocyanate containing the radical B and, if appropriate, a halopyrimidine or halotriazine compound comprising an amino substituent). They possess very good fiber-reactive dye properties and dye the materials specified in the description, such as cellulose fiber materials in particular, in high color strength and with good fastness properties in the hue indicated in the particular Tabular Example (in this case for cotton).

| Ex. | Radical D- | Radical R | Position of —NH—CO— | Radical B | Hue |
|---|---|---|---|---|---|
| 22 | 3-(β-Sulfatoethylsulfonyl)-phenyl | 3-Sulfo | 1- | 4-Methyl-1,3-phenylene | red (525) |
| 23 | 6-Methoxy-3-(β-sulfatoethylsulfonyl)phenyl | 3-Sulfo | 1- | 4-Methyl-1,3-phenylene | bluish red (550) |
| 24 | 2,5-Dimethoxy-4-(β-sulfatoethylsulfonylphenyl | 3-Sulfo | 1- | 4-Methyl-1,3-phenylene | bluish red (560) |
| 25 | 2-Methoxy-5-methyl-4-(β-sulfatoethylsulfonyl)phenyl | 3-Sulfo | 1- | 4-Methyl-1,3-phenylene | bluish red (546) |
| 26 | 4-(β-Sulfatoethylsulfonyl)phenyl | 4-Sulfo | 1- | 4-Methyl-1,3-phenylene | red (517) |
| 27 | 1-Sulfo-6-(β-sulfatoethylsulfonyl)naphth-2-yl | 4-Sulfo | 1- | 4-Methyl-1,3-phenylene | red (528) |
| 28 | 6-(β-Sulfatoethylsulfonyl)-naphth-2-yl | 3-Sulfo | 1- | 4-Methyl-1,3-phenylene | red (530) |
| 29 | 6-Sulfo-8-(β-Sulfato-ethylsulfonyl)naphth-2-yl | 3-Sulfo | 1- | 2-Methyl-1,4-phenylene | red (531) |
| 30 | 8-(β-Sulfatoethylsulfonyl)-naphth-2-yl | 3-Sulfo | 1- | Diphenyl-methan-4,4'-ylene | red (529) |
| 31 | 1-Sulfo-6-(β-sulfatoethylsulfonyl)naphth-2-yl | Hydrogen | 2- | 4-Methyl-1,3-phenylene | orange (489) |
| 32 | 1-Sulfo-6-(β-sulfatoethylsulfonyl)naphth-2-yl | Hydrogen | 3- | 4-Methyl-1,3-phenylene | orange (492) |
| 33 | 4-(β-Sulfatoethylsulfonyl)phenyl | 4-Sulfo | 3- | 4-Methyl-1,3-phenylene | orange (490) |
| 34 | 1-Sulfo-5-(2',4'-difluoro-pyrimidin-6'-yl)aminomethylenenaphth-2-yl | 3-Sulfo | 1- | 4-Methyl-1,3-phenylene | red (524) |
| 35 | 1-Sulfo-5-(5'-chloro-2',4'-difluoropyrimidin-6'-yl)-aminomethylenenaphth-2-yl | 4-Sulfo | 1- | 4-Methyl-1,3-phenylene | red (516) |
| 36 | 6-Sulfo-3-(4'-chloro-2',4'-difluoropyrimidin-6'-yl)aminophenyl | 3-Sulfo | 1- | 4-Methyl-1,3-phenylene | red (522) |
| 37 | 2-Sulfo-3-(4'-chloro-2',4'-difluoropyrimidin-6'-yl)aminophenyl | 3-Sulfo | 1- | 4-Methyl-1,3-phenylene | red (526) |
| 38 | 6-Sulfo-3-(2',4',5'-trichloropyrimidin-6'-yl)aminophenyl | 4-Sulfo | 1- | 2-Methyl-1,3-phenylene | red (530) |
| 39 | 6-Sulfo-3-(4'-chloro-2',4'-difluoropyrimidin-6'-yl)aminophenyl | 3-Sulfo | 1- | Diphenyl-methan-4,4'-ylene | red (531) |
| 40 | 6-Sulfo-3-(2',4'-difluoropyrimidin-6'-yl)aminophenyl | Hydrogen | 3- | 4-Methyl-1,3-phenylene | orange (493) |
| 41 | 6-Sulfo-3-(5'-chloro-2',4'-difluoropyrimidin-6'-yl)aminophenyl | 4-Sulfo | 3- | Diphenyl-methan-4,4'-ylene | orange (491) |
| 42 | 6-Sulfo-3-(4'-chloro-2'-amino-s-triazin-6'-yl)aminophenyl | 3-Sulfo | 1- | Diphenyl-methan-4,4'-ylene | red (520) |
| 43 | 6-Sulfo-3-(4'-chloro-2'-morpholino-s-triazin-6'-yl)aminophenyl | 3-Sulfo | 1- | Diphenyl-methan-4,4'-ylene | red (523) |
| 44 | 6-Sulfo-3-[4'-fluoro-2'-(2"-carboxyphenyl)amino-s-triazin-6'-yl]aminophenyl | 3-Sulfo | 1- | 2-Methyl-1,3-phenylene | red (526) |
| 45 | 6-Sulfo-3-[4'-fluoro-2'-(2"-sulfophenyl)amino-s-triazin-6'-yl]aminophenyl | 3-Sulfo | 1- | 4-Methyl-1,3-phenylene | red (521) |
| 46 | 6-Sulfo-3-[4'-fluoro-2'-(1"-sulfonaphth-2"-yl)amino-s-triazin-6'-yl]amino | 3-Sulfo | 1- | 4-Methyl-1,3-phenylene | red (518) |

EXAMPLES 47 TO 70

The following Tabular Examples describe further novel dyes of the formula (B)

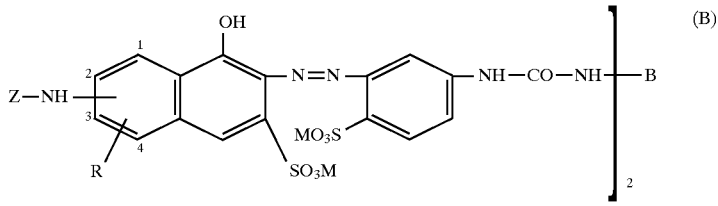

(in which M is as defined in the description) on the basis of the components corresponding to the formula radicals of formula (B). They can be prepared in a manner in accordance with the invention, for example analogously to one of Examples 6 to 10, from the starting compounds which are evident from the formula (B) (such as from the 4-sulfo-1,3-diaminobenzene, a sulfoaminonaphthol, a diisocyanate containing the radical B and, if appropriate, a halopyrimidine or halotriazine compound comprising an amino substituent). They possess very good fiber-reactive dye properties and dye the materials specified in the description, such as cellulose fiber materials in particular, in high color strength and with good fastness properties in the hue indicated in the particular Tabular Example (in this case for cotton).

| Ex. | Radical Z-NH— | Radical R | Radical B | Hue |
|---|---|---|---|---|
| 47 | 3-(5'-Chloro-2',4'-difluoropyrimidin-6'-yl)amino | Hydrogen | 4-Methyl-1,3-phenylene | orange (495) |
| 48 | 3-(2',4',5'-Trichloropyrimidin-6'-yl)amino | 4-Sulfo | 4-Methyl-1,3-phenylene | orange (498) |
| 49 | 1-(5'-Chloro-2',4'-difluoropyrimidin-6'-yl)amino | 3-Sulfo | 2-Methyl-1,3-phenylene | red (526) |
| 50 | 2-(2',4'-Difluoropyrimidin-6'-yl)amino | Hydrogen | 4-Methyl-1,3-phenylene | orange (500) |
| 51 | 1-(2',4'-Dichloro-s-triazin-6'-yl)amino | 3-Sulfo | 4-Methyl-1,3-phenylene | red (526) |
| 52 | 1-(2'-Chloro-4'-morpholinotriazin-6'-yl)amino | 3-Sulfo | 4-Methyl-1,3-phenylene | red (530) |
| 53 | 1-(2'-Fluoro-4'-phenylamino-s-triazin-6'-yl)amino | 3-Sulfo | Diphenylmethan-4,4'-ylene | red (527) |
| 54 | 1-[2'-Fluoro-4'-(3"-sulfophenyl)amino-s-triazin-6'-yl]amino | 3-Sulfo | Diphenylmethan-4,4'-yelene | red (525) |
| 55 | 1-[2'-Fluoro-4'-(2"-sulfophenyl)amino-s-triazin-6'-yl]amino | 4-Sulfo | Diphenylmethan-4,4'-yelene | red (531) |
| 56 | 1-[2'-Fluoro-4'-(2"-sulfophenyl)amino-s-triazin-6'-yl]amino | 3-Sulfo | 1,4-Phenylene | red (535) |
| 57 | 1-[2'-Fluoro-4'-(2"-sulfophenyl)amino-s-triazin-6'-yl]amino | 3-Sulfo | 1,6-Hexamethylene | red (528) |
| 58 | 1-[2'-Fluoro-4'-(2"-sulfophenyl)amino-s-triazin-6'-yl]amino | 3-Sulfo | 1,3-Propylene | red (526) |
| 59 | 1-{2'-Cyanoamino-4'-[4"-(β-sulfatoethylsulfonyl)phenyl]amino-s-triazin-6'-yl}amino | 3-Sulfo | 4-Methyl-1,3-phenylene | red (530) |
| 60 | 1{2'-Cyanoamino-4'-[3"-(β-sulfatoethylsulfonyl)phenyl]amino-s-triazin-6'-yl}amino | 3-Sulfo | 4-Methyl-1,3-phenylene | red (528) |
| 61 | 1-{2'-Chloro-4'-[4"-(β-sulfatoethylsulfonyl)phenyl]amino-s-triazin-6'-yl}amino | 3-Sulfo | 4-Methyl-1,3-phenylene | red (526) |
| 62 | 1-{2'-Chloro-4'-[3"-(β-sulfatoethylsulfonyl)phenyl]amino-s-triazin-6'-yl}amino | 3-Sulfo | 4-Methyl-1,3-phenylene | red (526) |
| 63 | 1 {2'-Chloro-4'-[N-phenyl-N-β-(β'-sulfatoethylsulfonyl)ethyl]amino-s-triazin-6'-yl}amino | 4-Sulfo | 1,3-Phenylene | red (520) |
| 64 | 1-{2'-Cyanoamino-4'-[3"-(γ-sulfatopropylsulfonyl)phenyl]amino-s-triazin-6'-yl}amino | | Phenylene | (528) |
| 65 | 1-{2'-Fluoro-4'-[3"-(γ-sulfatopropylsulfonyl)phenyl]amino-s-triazin-6'-yl}amino | 3-Sulfo | 1,3-Phenylene | orange (530) |
| 66 | 3-[2'-Chloro-4'-(2",5"-disulfophenyl)amino-s-triazin-6'-yl]amino | Hydrogen | 1,3-Phenylene | orange (487) |
| 67 | 3-[2'-Fluoro-4'-(2",5"-disulfophenyl)amino-s-triazin-6'-yl]amino | Hydrogen | 1,3-Phenylene | orange (489) |
| 68 | 3-[2'-Chloro-4'-(2",4"-disulfophenyl)amino-s-triazin-6'-yl]amino | Hydrogen | 1,3-Phenylene | orange (490) |
| 69 | 2-[2'-Fluoro-4'-(2",5"-disulfophenyl)amino-s-triazin-6'-yl]amino | 4-Sulfo | 1,3-Phenylene | orange (490) |
| 70 | 3-[2'-Fluoro-4'-(5"-sulfophenyl)amino-s-triazin-6'-yl]amino | 4-Sulfo | 1,3-Phenylene | orange (491) |

EXAMPLES 71 TO 87

The following Tabular Examples describe further novel dyes of the formulae (C) and (D)

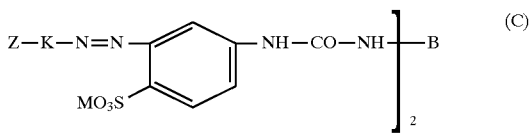

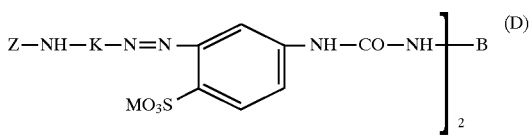

(in which M is as defined in the description) on the basis of the components corresponding to the formula radicals of formula (C) or (D). They can be prepared in a manner in accordance with the invention, for example analogously to one of Examples 12 to 18, from the starting compounds which are evident from the formula (C) or (D) (such as from the 4-sulfo-1,3-diaminobenzene, an optionally amino-containing coupling component of the formula H—K—H or $H_2N$—K—H, respectively, a diisocyanate containing the radical B and, if appropriate, a halopyrimidine or halotriazine compound comprising an amino substituent). They possess very good fiber-reactive dye properties and dye the materials specified in the description, such as cellulose fiber materials in particular, in high color strength and with good fastness properties in the hue indicated in the particular Tabular Example (in this case for cotton).

| Ex. | For- mula | Radical Z-K— or Z-NH—K— | Radical B | Hue |
|---|---|---|---|---|
| 71 | (C) | 1-(4'-Vinylsulfonylphenyl)-3-carboxypyrazol-5-one-6-yl | 4-Methyl-1,3-phenylene | bright yellow (389) |
| 72 | (C) | 1-(4'-Vinylsulfonylphenyl)-3-methylpyrazol-5-one-6-yl | 1,3-Phenylene | bright yellow (391) |
| 73 | (C) | 1-[4'-(β-Sulfatoethylsulfonyl)phenyl]-3-methylpyrazol-5-one-6-yl | 1,4-Phenylene | bright yellow (392) |
| 74 | (D) | 1-N-[β-(2',4'-Difluoropyrimidin-6'-yl)-aminoethyl]-3-methyl-4-cyano-2-hydroxypyrid-2-one-5-yl | Diphenyl-methan-4,4'-ylene | bright yellow (405) |
| 75 | (D) | 1-N-[γ-(2',4'-Difluoropyrimidin-6'-yl)aminopropyl]-3-methyl-4-carbamoyl-2-hydroxypyrid-2-one-5-yl | 2-Methyl-1,3-phenylene | bright yellow (404) |
| 76 | (D) | 4-[2'-Fluoro-4'-(β-sulfoethylamino)-s-triazin-6'-yl]amino-2-ureidophenyl | Diphenyl-methan-4,4'-ylene | golden yellow (418) |
| 77 | (D) | 4-(2'-Fluoro-4'-phenylamino-s-triazin-6'-yl)amino-2-ureidophenyl | Biphen-4,4'-ylene | golden yellow (422) |
| 78 | (D) | 4-(2'-Chloro-4'-amino-s-triazin-6'-yl)amino-2-acetylaminophenyl | Phen-1,4-ylene | yellow (411) |
| 79 | (D) | 4-[2'-Fluoro-4'-(2"-sulfophenyl)amino-s-triazin-6'-yl]amino-2-acetylaminophenyl | Phen-1,3-ylene | golden yellow (417) |
| 80 | (D) | 4-[2'-Fluoro-4'-(2"-sulfophenyl)amino-s-triazin-6'-yl]amino-2-acetylamino-5-sulfophenyl | 4-Methyl-phen-1,3-ylene | yellow (418) |
| 81 | (D) | 4-[2'-Fluoro-4'-(3"-sulfophenyl)amino-s-triazin-6'-yl]amino-2-acetylamino-5-sulfophenyl | 4-Methyl-phen-1,3-ylene | yellow (415) |
| 82 | (D) | 4-[2'-Fluoro-4'-(2"-sulfophenyl)amino-s-triazin-6'-yl]amino-2-acetylamino-5-methoxyphenyl | 4-Methyl-phen-1,3-ylene | yellow (410) |
| 83 | (D) | 4-[2'-Fluoro-4'-(3"-sulfophenyl)amino-s-triazin-6'-yl]amino-5-sulfonaphth-1-yl | 2-Methyl-phen-1,3-ylene | golden yellow (418) |
| 84 | (D) | 4-[2'-Fluoro-4'-(2"-sulfophenyl)amino-s-triazin-6'-yl]amino-7-sulfonaphth-1-yl | Phen-1,3-ylene | golden yellow (419) |
| 85 | (D) | 4-[2'-Fluoro-4'-(2"-carboxyphenyl)amino-s-triazin-6'-yl]amino-5-sulfonaphth-1-yl | Phen-1,3-ylene | golden yellow (421) |
| 86 | (D) | 4-(2',4'-Difluoropyrimidin-6'-yl)amino-7-sulfonaphth-1-yl | Phen-1,3-ylene | golden yellow (422) |
| 87 | (D) | 4-[3'-(β-Chloroethylsulfonyl)-phenyl]amino-7-naphth-1-yl | Phen-1,3-ylene | golden yellow (420) |

EXAMPLES 88 TO 95

The following Tabular Examples describe further novel dyes of the formulae (E) and (F)

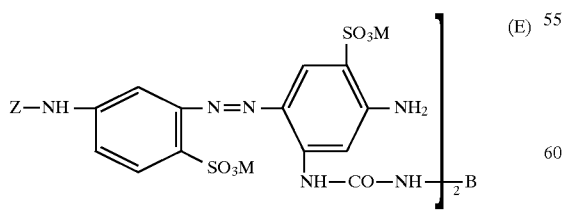

(E)

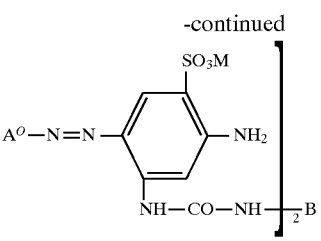

(F)

(in which M is as defined in the description) on the basis of the components corresponding to the formula radicals of formula (E) or (F). They can be prepared in a manner in accordance with the invention, for example analogously to one of Examples 19 to 21, from the starting compounds which are evident from the formula (E) or (F) (such as from the 4-sulfo-1,3-diaminobenzene, both as diazo components and as coupling component or from the 2-aminonaphthalene compound as diazo component $A^O$—$NH_2$, a diisocyanate containing the radical B and, if appropriate, a halopyrimidine or halotriazine compound comprising an amino substituent or another acid chloride compound comprising a fiber-reactive radical). They possess very good fiber-reactive dye properties and dye the materials specified in the description, such as cellulose fiber materials in particular, in high color strength and with good fastness properties in the hue indicated in the particular Tabular Example (in this case for cotton).

| Ex. | Radical Z- | Radical B | Hue |
|---|---|---|---|
| 88 | 5-Chloro-2,4-difluoro-pyrimidin-6-yl | 4-Methyl-phen-1,3-ylene | golden yellow (418) |
| 89 | 5-Cyano-2,4-dichloro-pyrimidin-6-yl | Diphenylmethan-4,4'-ylene | golden yellow (419) |
| 90 | 3-Vinylsulfonyl-benzoyl | Phen-1,3-ylene | golden yellow (417) |
| 91 | 4-Fluoro-2-phenylamino-s-triazin-6-yl | Phen-1,4-ylene | golden yellow (420) |
| 92 | 4-Fluoro-2-[4'-(β-sulfato-ethylsulfonyl)-phenyl]-amino-s-triazin-6-yl | 1,6-Hexamethylene | golden yellow (420) |
| 93 | 4-Cyano-2-[3'-(β-sulfato-ethylsulfonyl)-phenyl]-amino-s-triazin-6-yl | Phen-1,4-ylene | golden yellow (418) |

| Ex. | Radical $A^°$- | Radical B | Hue |
|---|---|---|---|
| 94 | 6-Sulfo-8-(β-sulfato-ethylsulfonyl)-naphth-2-yl | 4-Methyl-phen-1,3-ylene | golden yellow (415) |
| 95 | 1-Sulfo-6-(β-sulfato-ethylsulfonyl)-naphth-2-yl | Diphenylmethan-4,4'-ylene | golden yellow (417) |

EXAMPLES 96 TO 103

The following Tabular Examples describe further novel dyes of the formula (G)

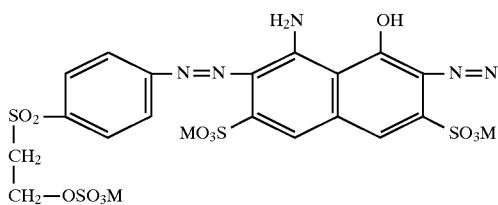 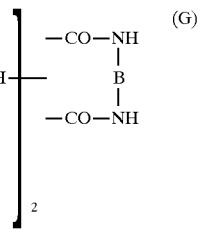 (G)

(in which M is as defined in the description) on the basis of the components corresponding to the formula radicals of formula (G). They can be prepared in a manner in accordance with the invention, for example analogously to that of Example 11, from the starting compounds which are evident from the formula (G) (such as from the 4-(β-sulfatoethylsulfonyl)aniline as diazo component, the 3,6-disulfo-1-amino-8-naphthol as bivalent coupling component, a diaminoaryl compound $H_2N-G-NH_2$ and a diisocyanate containing the radical B). They possess very good fiber-reactive dye properties and dye the materials specified in the description, such as cellulose fiber materials in particular, in high color strength and with good fastness properties in the hue indicated in the particular Tabular Example (in this case for cotton).

| Ex. | Radical G *) | Radical B | Hue |
|---|---|---|---|
| 96 | 6-Sulfophenyl-1,3-ylene | 4-Methyl-phen-1,3-ylene | navy |
| 97 | " | Phen-1,4-ylene | navy |
| 98 | " | Phen-1,3-ylene | navy |
| 99 | " | 4-Methyl-phen-1,3-ylene | navy |
| 100 | 2,4-Disulfophen-1,3-ylene | Phen-1,4-ylene | navy |
| 101 | 5-Sulfophenyl-1,3-ylene | Phen-1,4-ylene | navy |
| 102 | 2,5-Disulfophen-1,4-ylene | Diphenylmethan-4,4'-ylene | navy |
| 103 | 2,5-Disulfophen-1,4-ylene | Biphen-4,4'-ylene | navy |

*) Position 1 of G is attached to the azo group.

I claim:

1. An azo dye of the formula (1)

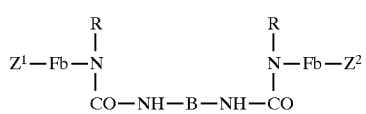

(1)

in which:

Fb is—at each occurrence, identically to or differently from the other—the radical of a sulfo-containing monoazo, disazo or trisazo dye or the radical of a sulfo-containing metal complex monoazo or disazo dye;

R is—at each occurrence, identically to or differently from the other—hydrogen, methyl or ethyl;

B is a bridge consisting of an aliphatic and/or aromatic hydrocarbon with or without one or two olefinic bonds and optionally comprising 1 or 2 hetero-groups;

$Z^1$ is a fiber-reactive group from the heterocyclic series which is attached to Fb by way of an amino group of Fb, or is a fiber-reactive group from the vinyl sulfone series or from the dihaloacryloylamino series, or is a fiber-reactive grouping which consists of a combination of a fiber-reactive group from the heterocyclic series and from the vinyl sulfone series or of a substituted triazine radical with a fiber-reactive group from the vinyl sulfone series, or is a grouping with a β-hydroxyethylsulfonyl group and/or with a hydroxy- or cyanoamino-containing triazine radical or a hydroxy-containing pyrimidine radical, where the heterocyclic radical is attached to Fb in each case by way of an amino group of Fb;

$Z^2$ is a fiber-reactive group from the heterocyclic series which is attached to Fb by way of an amino group of Fb, or is a fiber-reactive group from the vinyl sulfone series or from the dihaloacryloylamino series, or is a fiber-reactive grouping which consists of a combination of fiber-reactive groups from the heterocyclic series and the vinyl sulfone series or of a substituted triazine radical with a fiber-reactive group from the vinyl sulfone series, where the heterocyclic radical is attached to Fb in each case by way of an amino group of Fb.

2. A dye as claimed in claim 1 of the formula (1A)

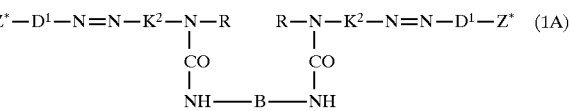 (1A)

in which

B is as defined in claim 1,

R at each occurrence, identically to or differently from the other, is as defined in claim 1, Z* at each occurrence, identically to or differently from the other, is a nonheterocyclic fiber-reactive group in accordance with $Z^1$ or $Z^2$, $D^1$ is the radical of a diazo component of the benzene or naphthalene series, and $K^2$ at each occurrence, identically to or differently from the other, is the radical of a coupling component of the aniline, diaminobenzene, aminonaphthalene, acetoacet(aminoaryl)amide, 1-(aminophenyl)pyrazolone or 1-(aminonaphthyl)pyrazolone series.

3. A dye as claimed in claim 1 of the formula (1B)

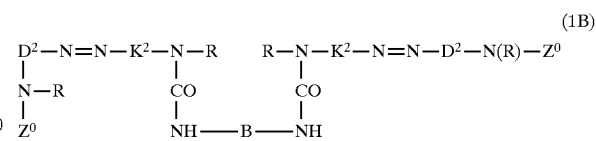 (1B)

in which

B is as defined in claim 1,

R at each occurrence, identically to or differently from the other, is as defined in claim 1, $Z^0$ is a heterocyclic fiber-reactive group or another heterocyclic grouping in accordance with $Z^1$, $D^2$ is at each occurrence, identically to or differently from the other, the radical of a diazo component of the diaminobenzene or diaminonaphthalene series, and $K^2$ at each occurrence, identically to or differently from the other, is the radical of a coupling component of the aniline, aminonaphthalene, diaminobenzene, acetoacet (aminoaryl)amide, 1-(aminophenyl)pyrazolone or 1-(aminonaphthyl)pyrazolone series.

4. A dye as claimed in claim 1 of the formula (1C)

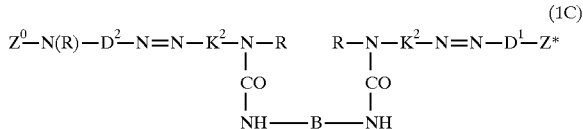

in which

B is as defined in claim 1,

R at each occurrence, identically to or differently from the other, is as defined in claim 1, Z* is a nonheterocyclic fiber-reactive group in accordance with $Z^1$ or $Z^2$, $Z^0$ is a heterocyclic fiber-reactive group or another heterocyclic grouping in accordance with $Z^1$, $D^1$ is the radical of a diazo component of the benzene or naphthalene series, $D^2$ is the radical of a diazo component of the diaminobenzene or diaminonaphthalene series, and $K^2$ at each occurrence, identically to or differently from the other, is the radical of a coupling component of the aniline, aminonaphthalene, diaminobenzene, acetoacet (aminoaryl)amide, 1-(aminophenyl)pyrazolone or 1-(aminonaphthyl)pyrazolone series.

5. A dye as claimed in claim 1 of the formula (1D)

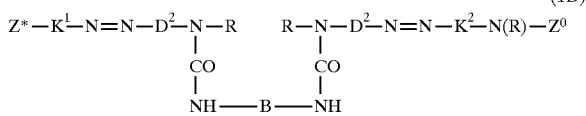

in which

B is as defined in claim 1,

R at each occurrence, identically to or differently from the other, is as defined in claim 1, Z* is a nonheterocyclic fiber-reactive group in accordance with $Z^1$ or $Z^2$, $Z^0$ is a heterocyclic fiber-reactive group or another heterocyclic grouping in accordance with $Z^1$, $D^2$ is at each occurrence, identically to or differently from the other, the radical of a diazo component of the diaminobenzene or diaminonaphthalene series, $K^1$ is the radical of a coupling component of the benzene or naphthalene series or of the heterocyclic series, and $K^2$ is the radical of a coupling component of the aniline, diaminobenzene, aminonaphthalene, acetoacet (aminoaryl)amide, 1-(aminophenyl)pyrazolone or 1-(aminonaphthyl)pyrazolone series.

6. A dye as claimed in claim 1 of the formula (1E)

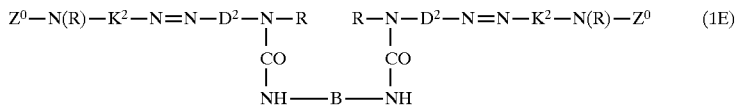

in which

B is as defined in claim 1,

R at each occurrence, identically to or differently from the other, is as defined in claim 1, $Z^0$ at each occurrence, identically to or differently from the other, is a heterocyclic fiber-reactive group or another heterocyclic grouping in accordance with $Z^1$, $D^2$ is at each occurrence, identically to or differently from the other, the radical of a diazo component of the diaminobenzene or diaminonaphthalene series, and $K^2$ at each occurrence, identically to or differently from the other, is the radical of a coupling component of the aniline, aminonaphthalene, diaminobenzene, acetoacet (aminoaryl)amide, 1-(aminophenyl)pyrazolone or 1-(aminonaphthyl)pyrazolone series.

7. A dye as claimed in claim 1 of the formula (1F) or (1G)

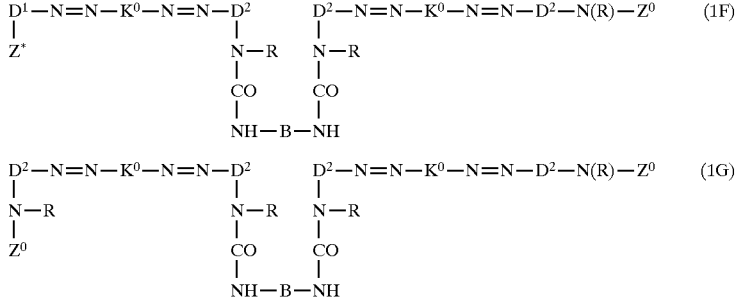

in which

B is as defined in claim 1,

R at each occurrence, identically to or differently from the other, is as defined in claim 1, Z* is a nonheterocyclic fiber-reactive group in accordance with $Z^1$ or $Z^2$, $Z^0$ is at each occurrence, identically to or differently from the other, a heterocyclic fiber-reactive group or another heterocyclic grouping in accordance with $Z^1$, D¹ is the radical of a diazo component of the benzene or naphthalene series, D² is at each occurrence, identically to or differently from the other, the radical of a diazo component of the diaminobenzene or diaminonaphthalene series, and K⁰ at each occurrence, identically to or differently from the other, is the radical of 3,6-disulfo- or 4,6-disulfo-1-amino-8-hydroxynaphth-2,7-ylene.

8. A dye as claimed in claim 2, wherein $Z^*—D^1—$, at each occurrence, identically to or differently from the other, is a group of the formula (4a) or (4b)

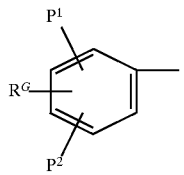

(4a)

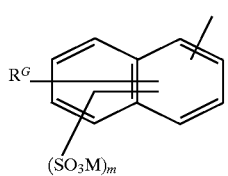

(4b)

in which $R^G$ is a fiber-reactive group of the formula (a)

$$Y—SO_2—W— \quad (a)$$

in which

Y is vinyl or is ethyl which is substituted in the β-position by an alkali-eliminable substituent, and W is a direct covalent bond or is alkylene of 1 to 4 carbon atoms, or is an amino group of the formula (b)

(b)

in which $R^0$ is hydrogen, alkyl of 1 to 4 carbon atoms or phenyl which is unsubstituted or substituted by 1 or 2 substituents selected from the group consisting of sulfo, methyl, methoxy, ethyl, ethoxy, carboxy and chlorine, P¹ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C₁–C₄-alkyl)carbamoyl, fluorine, chlorine, bromine or trifluoromethyl, P² is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C₁–C₄-alkyl)sulfamoyl, sulfophenylamidocarbonyl, phenylamidocarbonyl, alkylsulfonyl of 1 to 4 carbon atoms, phenylsulfonyl or phenoxy, where the benzene nucleus in formulae (4a) and (4b) may additionally comprise a hydroxy group ortho to the free bond which leads to the azo group, m is zero, 1 or 2 (and if m is zero this group is a hydrogen atom) and M is as defined above.

9. A dye as claimed in claim 4, wherein $Z^*—D^1—$, at each occurrence, identically to or differently from the other, is a group of the formula (4a) or (4b)

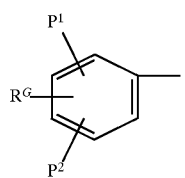

(4a)

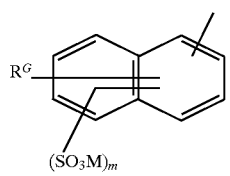

(4b)

in which $R^G$ is a fiber-reactive group of the formula (a)

$$Y—SO_2—W— \quad (a)$$

in which

Y is vinyl or is ethyl which is substituted in the β-position by an alkali-eliminable substituent, and W is a direct covalent bond or is alkylene of 1 to 4 carbon atoms, or is an amino group of the formula (b)

(b)

in which $R^0$ is hydrogen, alkyl of 1 to 4 carbon atoms or phenyl which is unsubstituted or substituted by 1 or 2 substituents selected from the group consisting of sulfo, methyl, methoxy, ethyl, ethoxy, carboxy and chlorine, P¹ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C₁–C₄-alkyl)carbamoyl, fluorine, chlorine, bromine or trifluoromethyl, P² is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C₁–C₄-alkyl)sulfamoyl, sulfophenylamidocarbonyl, phenylamidocarbonyl, alkylsulfonyl of 1 to 4 carbon atoms, phenylsulfonyl or phenoxy, where the benzene nucleus in formulae (4a) and (4b) may additionally comprise a hydroxy group ortho to the free bond which leads to the azo group, m is zero, 1 or 2 (and if m is zero this group is a hydrogen atom) and M is as defined above.

10. A dye as claimed in claim 7, wherein $Z^*—D^1—$, at each occurrence, identically to or differently from the other, is a group of the formula (4a) or (4b)

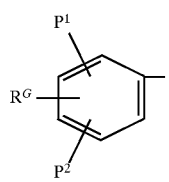

(4a)

-continued

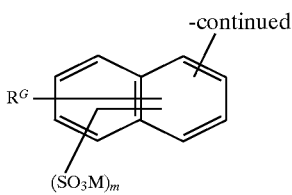
(4b)

in which
R$^G$ is a fiber-reactive group of the formula (a)

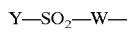
Y—SO$_2$—W— (a)

in which
Y is vinyl or is ethyl which is substituted in the β-position by an alkali-eliminable substituent, and
W is a direct covalent bond or is alkylene of 1 to 4 carbon atoms, or is an amino group of the formula (b)

(b)

in which
R$^o$ is hydrogen, alkyl of 1 to 4 carbon atoms or phenyl which is unsubstituted or substituted by 1 or 2 substituents selected from the group consisting of sulfo, methyl, methoxy, ethyl, ethoxy, carboxy and chlorine,
P$^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C$_1$–C$_4$-alkyl)carbamoyl, fluorine, chlorine, bromine or trifluoromethyl,
P$^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C$_1$–C$_4$-alkyl)sulfamoyl, sulfophenylamidocarbonyl, phenylamidocarbonyl, alkylsulfonyl of 1 to 4 carbon atoms, phenylsulfonyl or phenoxy,
where the benzene nucleus in formulae (4a) and (4b) may additionally comprise a hydroxy group ortho to the free bond which leads to the azo group,
m is zero, 1 or 2 (and if m is zero this group is a hydrogen atom) and
M is as defined above.

11. A dye as claimed in claim 3, wherein the radical Z$^0$—N(R)—D$^2$— at each occurrence, identically to or differently from the other, is a group of the formula (6a) or (6b)

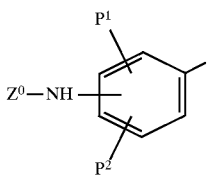
(6a)

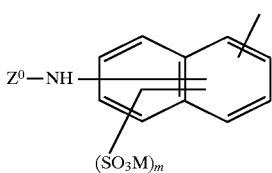
(6b)

in which
Z$^0$ is a heterocyclic fiber-reactive group or another heterocyclic grouping in accordance with Z$^1$,
P$^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C$_1$–C$_4$-alkyl)carbamoyl, fluorine, chlorine, bromine or trifluoromethyl, and
P$^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C$_1$–C$_4$-alkyl)sulfamoyl, sulfophenylamidocarbonyl, phenylamidocarbonyl, alkylsulfonyl of 1 to 4 carbon atoms, phenylsulfonyl or phenoxy.

12. A dye as claimed in claim 4, wherein the radical Z$^0$—N(R)—D$^2$— at each occurrence, identically to or differently from the other, is a group of the formula (6a) or (6b)

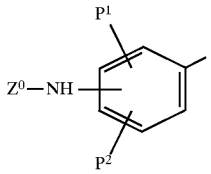
(6a)

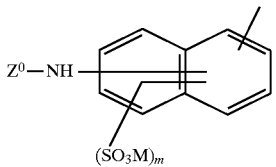
(6b)

in which
Z$^0$ is a heterocyclic fiber-reactive group or another heterocyclic grouping in accordance with Z$^1$,
P$^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C$_1$–C$_4$-alkyl)carbamoyl, fluorine, chlorine, bromine or trifluoromethyl, and
P$^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C$_1$–C$_4$-alkyl)sulfamoyl, sulfophenylamidocarbonyl, phenylamidocarbonyl, alkylsulfonyl of 1 to 4 carbon atoms, phenylsulfonyl or phenoxy.

13. A dye as claimed in claim 5, wherein the radical Z$^0$—N(R)—D$^2$— at each occurrence, identically to or differently from the other, is a group of the formula (6a) or (6b)

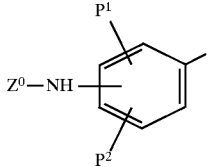
(6a)

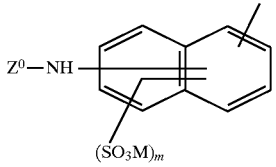
(6b)

in which
Z$^0$ is a heterocyclic fiber-reactive group or another heterocyclic grouping in accordance with Z$^1$,
P$^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C$_1$–C$_4$- alkyl)carbamoyl, fluorine, chlorine, bromine or trifluoromethyl, and

P² is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C₁-C₄-alkyl)sulfamoyl, sulfophenylamidocarbonyl, phenylamidocarbonyl, alkylsulfonyl of 1 to 4 carbon atoms, phenylsulfonyl or phenoxy.

14. A dye as claimed in claim 6, wherein the radical Z⁰—N(R)—D²— at each occurrence, identically to or differently from the other, is a group of the formula (6a) or (6b)

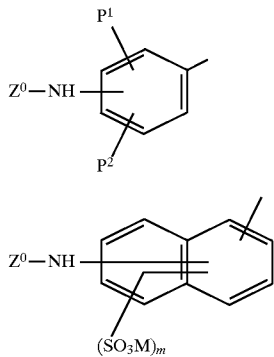

in which

Z is a heterocyclic fiber-reactive group or another heterocyclic grouping in accordance with Z¹, P¹ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C₁-C₄-alkyl)carbamoyl, fluorine, chlorine, bromine or trifluoromethyl, and P² is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C₁-C₄-alkyl)sulfamoyl, sulfophenylamidocarbonyl, phenylamidocarbonyl, alkylsulfonyl of 1 to 4 carbon atoms, phenylsulfonyl or phenoxy.

15. A dye as claimed in claim 7, wherein the radical Z⁰—N(R)—D²— at each occurrence, identically to or differently from the other, is a group of the formula (6a) or (6b)

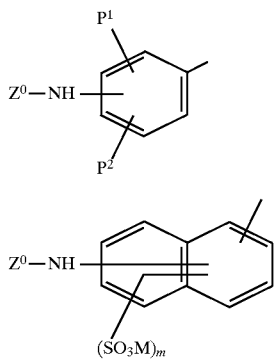

in which

Z⁰ is a heterocyclic fiber-reactive group or another heterocyclic grouping in accordance with Z¹, P¹ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-(C₁-C₄-alkyl)carbamoyl, fluorine, chlorine, bromine or trifluoromethyl, and P² is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-(C₁-C₄-alkyl)sulfamoyl, sulfophenylamidocarbonyl, phenylamidocarbonyl, alkylsulfonyl of 1 to 4 carbon atoms, phenylsulfonyl or phenoxy.

16. A dye as claimed in claim 5, wherein —K²—N(R)—Z⁰ at each occurrence, identically to or differently from the other, is a group of the formula (9a), (9b), (9c), (9d), (9e), (9f), (9g), (9h) or (9i)

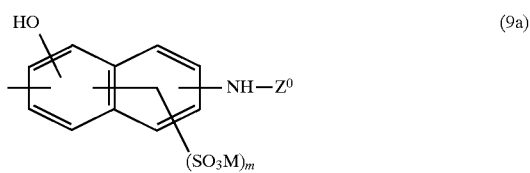

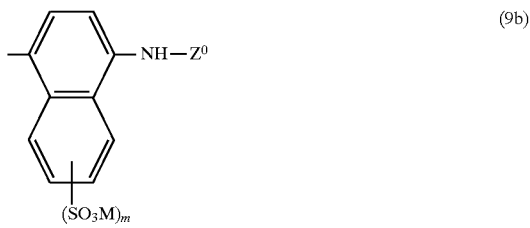

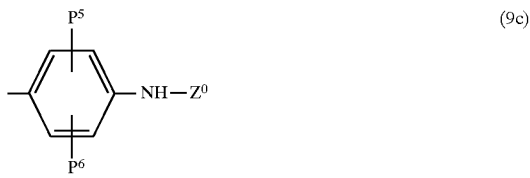

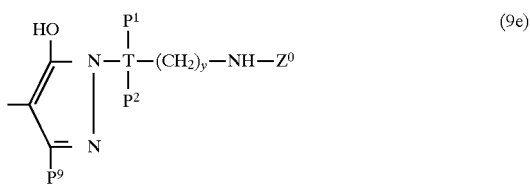

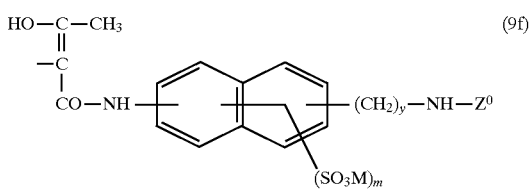

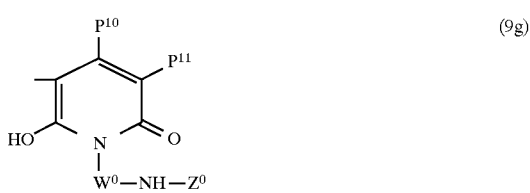

(9h)

$$\text{HO}-\underset{\underset{\text{CO}-\text{NH}}{|}}{\overset{\overset{\text{CH}_3}{|}}{\text{C}}}-\text{Ar}(\text{P}^1, \text{P}^2)-(\text{CH}_2)_y-\text{NH}-\text{Z}^0$$

(9i)

Naphthalene with HO, NH₂, N=N—D⁶, MO₃S, (SO₃M)ₘ substituents in which

- M is hydrogen or an alkali metal,
- $P^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-($C_1$–$C_4$-alkyl)carbamoyl, fluorine, chlorine, bromine or trifluoromethyl,
- $P^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-($C_1$–$C_4$-alkyl)sulfamoyl, sulfophenylamidocarbonyl, phenylamidocarbonyl, alkylsulfonyl of 1 to 4 carbon atoms, phenylsulfonyl or phenoxy,
- $P^9$ is hydrogen, alkyl of 1 to 4 carbon atoms, cyano, carboxy, carboalkoxy of 2 to 5 carbon atoms, carbamoyl or phenyl,
- $P^{10}$ is hydrogen, alkyl of 1 to 4 carbon atoms or alkyl of 1 to 4 carbon atoms substituted by alkoxy of 1 to 4 carbon atoms or cyano, or is phenyl,
- $P^{11}$ is hydrogen, chlorine, bromine, sulfo, carbamoyl, methylsulfonyl, phenylsulfonyl, cyano or sulfoalkyl of 1 to 4 carbon atoms,
- $W^0$ is alkylene of 1 to 4 carbon atoms, methylenephenylene, ethylenephenylene, phenylenemethylene, phenyleneethylene or phenylene or is methylenephenylene, ethylenephenylene or phenylene, each of which is substituted in the benzene radical by substituents selected from the group consisting of fluorine, chlorine, bromine, methyl, methoxy, cyano, sulfo, carboxy, acetyl, nitro, carbamoyl and sulfamoyl,
- T is a benzene or naphthalene radical,
- m is zero, 1 or 2,
- $Z^0$ is a heterocyclic fiber-reactive group or another heterocyclic grouping in accordance with $Z^1$,
- y is zero, 1 or 2,
- $P^5$ is hydrogen, alkyl of 1 to 4 carbon atoms, alkoxy of 1 to 4 carbon atoms, bromine, chlorine or sulfo,
- $P^6$ is hydrogen, alkyl of 1 to 4 carbon atoms, alkoxy of 1 to 4 carbon atoms, chlorine, alkanoylamino of 2 to 7 carbon atoms, ureido or phenylureido, and
- $D^6$ is a radical of the formula (6a) or (6b)

(6a)

$Z^0$—NH—phenyl ($P^1$, $P^2$)

(6b)

$Z^0$—NH—naphthyl—(SO₃M)ₘ in which $P^1$, $P^2$, m, M and $Z^0$ are as defined above.

17. A dye as claimed in claim 6, wherein —$K^2$—N(R)—$Z^0$ at each occurrence, identically to or differently from the other, is a group of the formula (9a), (9b), (9c), (9d), (9e), (9f), (9g), (9h) or (9i)

(9a)

Naphthalene with HO, NH—$Z^0$, (SO₃M)ₘ

(9b)

Naphthalene with NH—$Z^0$, (SO₃M)ₘ

(9c)

Phenyl with $P^5$, $P^6$, NH—$Z^0$

(9d)

Phenyl with $P^5$, NH₂, NH—$Z^0$

(9e)

$$\text{HO}-\overset{P^1}{\underset{\underset{P^9}{\parallel}}{\overset{|}{C}}}=\overset{|}{N}-\underset{\underset{P^2}{|}}{\overset{|}{T}}-(\text{CH}_2)_y-\text{NH}-Z^0$$

(9f)

$$\text{HO}-\underset{\underset{\text{CO}-\text{NH}}{|}}{\overset{\overset{\text{CH}_3}{|}}{\text{C}}}-\text{naphthyl}-(\text{CH}_2)_y-\text{NH}-Z^0, (\text{SO}_3\text{M})_m$$

-continued

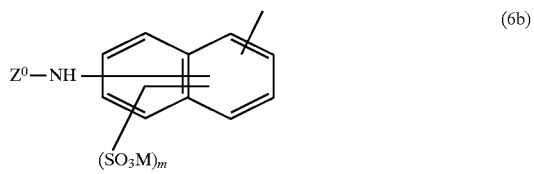
(9g)

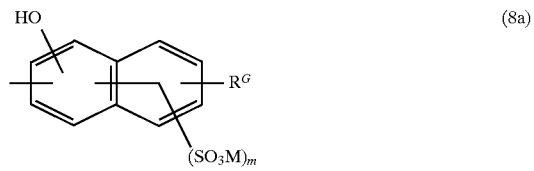
(9h)

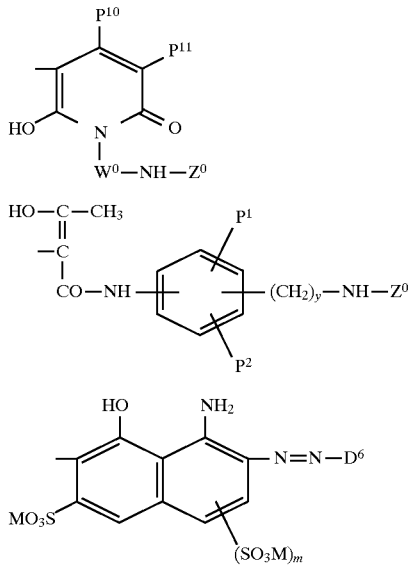
(9i)

in which

M is hydrogen or an alkali metal, $P^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-($C_1$-$C_4$-alkyl)carbamoyl, fluorine, chlorine, bromine or trifluoromethyl, $P^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-($C_1$-$C_4$-alkyl)sulfamoyl, sulfophenylamidocarbonyl, phenylamidocarbonyl, alkylsulfonyl of 1 to 4 carbon atoms, phenylsulfonyl or phenoxy, $P^9$ is hydrogen, alkyl of 1 to 4 carbon atoms, cyano, carboxy, carboalkoxy of 2 to 5 carbon atoms, carbamoyl or phenyl, $P^{10}$ is hydrogen, alkyl of 1 to 4 carbon atoms or alkyl of 1 to 4 carbon atoms substituted by alkoxy of 1 to 4 carbon atoms or cyano, or is phenyl, $P^{11}$ is hydrogen, chlorine, bromine, sulfo, carbamoyl, methylsulfonyl, phenylsulfonyl, cyano or sulfoalkyl of 1 to 4 carbon atoms, $W^0$ is alkylene of 1 to 4 carbon atoms, methylenephenylene, ethylenephenylene, phenylenemethylene, phenyleneethylene or phenylene or is methylenephenylene, ethylenephenylene or phenylene, each of which is substituted in the benzene radical by substituents selected from the group consisting of fluorine, chlorine, bromine, methyl, methoxy, cyano, sulfo, carboxy, acetyl, nitro, carbamoyl and sulfamoyl, T is a benzene or naphthalene radical, m is zero, 1 or 2, $Z^0$ is a heterocyclic fiber-reactive group or another heterocyclic grouping in accordance with $Z^1$, y is zero, 1 or 2, $P^5$ is hydrogen, alkyl of 1 to 4 carbon atoms, alkoxy of 1 to 4 carbon atoms, bromine, chlorine or sulfo, $P^6$ is hydrogen, alkyl of 1 to 4 carbon atoms, alkoxy of 1 to 4 carbon atoms, chlorine, alkanoylamino of 2 to 7 carbon atoms, ureido or phenylureido, and $D^6$ is a radical of the formula (6a) or (6b)

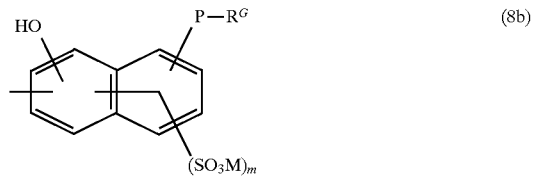
(6a)

(6b)

in which $P^1$, $P^2$, m, M and $Z^0$ are as defined above.

18. A dye as claimed in claim 5, wherein $Z^*$—$K^1$— is a group of the formula (8a), (8b), (8c), (8d), (8e), (8f) or (8g)

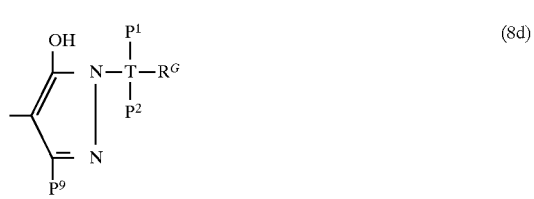
(8a)

(8b)

(8c)

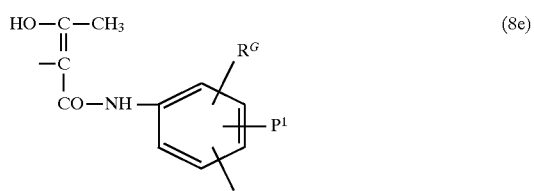
(8d)

(8e)

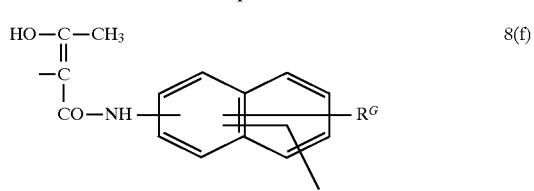
8(f)

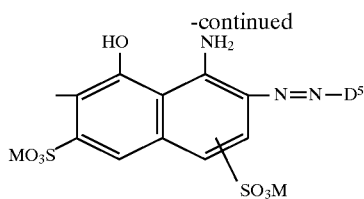 (8g)

in which

M is hydrogen or an alkali metal, $R^G$ is a fiber-reactive group of the formula (a)

Y—SO$_2$—W— (a)

in which

Y is vinyl or is ethyl which is substituted in the β-position by an alkali-eliminable substituent, and W is a direct covalent bond or is alkylene of 1 to 4 carbon atoms, or is an amino group of the formula (b)

 (b)

in which $R^0$ is hydrogen, alkyl of 1 to 4 carbon atoms or phenyl which is unsubstituted or substituted by 1 or 2 substituents selected from the group consisting of sulfo, methyl, methoxy, ethyl, ethoxy, carboxy and chlorine, $P^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N-($C_1$–$C_4$-alkyl)carbamoyl, fluorine, chlorine, bromine or trifluoromethyl, $P^2$ is hydrogen, methyl, ethyl, methoxy, ethoxy, cyano, nitro, carboxy, sulfo, chlorine, alkanoylamino of 2 to 5 carbon atoms, alkoxycarbonyl of 2 to 5 carbon atoms, carbamoyl, N-($C_1$–$C_4$-alkyl)sulfamoyl, sulfophenylamidocarbonyl, phenylamidocarbonyl, alkylsulfonyl of 1 to 4 carbon atoms, phenylsulfonyl or phenoxy, $P^9$ is hydrogen, alkyl of 1 to 4 carbon atoms, cyano, carboxy, carboalkoxy of 2 to 5 carbon atoms, carbamoyl or phenyl, T is a benzene or naphthalene radical, $P^{10}$ is hydrogen, alkyl of 1 to 4 carbon atoms or alkyl of 1 to 4 carbon atoms substituted by alkoxy of 1 to 4 carbon atoms or cyano, or is phenyl, $P^{11}$ is hydrogen, chlorine, bromine, sulfo, carbamoyl, methylsulfonyl, phenylsulfonyl, cyano or sulfoalkyl of 1 to 4 carbon atoms, $W^0$ is alkylene of 1 to 4 carbon atoms, methylenephenylene, ethylenephenylene, phenylenemethylene, phenyleneethylene or phenylene or is methylenephenylene, ethylenephenylene or phenylene, each of which is substituted in the benzene radical by substituents selected from the group consisting of fluorine, chlorine, bromine, methyl, methoxy, cyano, sulfo, carboxy, acetyl, nitro, carbamoyl and sulfamoyl, and $D^5$ is a group of the formula (4a) or (4b)

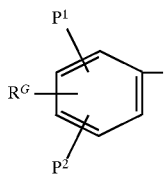 (4a)

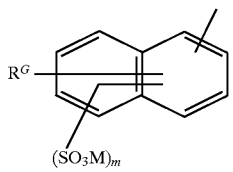 (4b)

in which $R^G$, $B^1$, $P^2$, M and m are as defined above.

19. A dye as claimed in claim 1, wherein B is alkylene of 1 to 8 carbon atoms or is alkylene of 2 to 8 carbon atoms which is interrupted by one or two hetero-groups, or is a group of the formula (2a), (2b), (2c), (2d) or (2e)

 (2a)

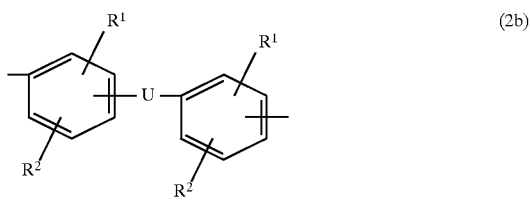 (2b)

 (2c)

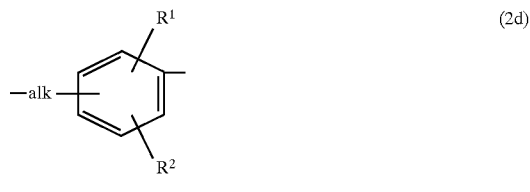 (2d)

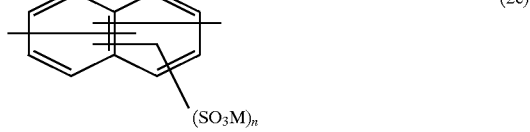 (2e)

in which $R^1$ is hydrogen, alkyl of 1 to 4 carbon atoms, alkoxy of 1 to 4 carbon atoms, hydroxy, sulfo, carboxy, cyano, nitro, aminocarbonyl, alkanoylamino of 2 to 5 carbon atoms, benzoylamino, ureido, alkylcarbonyl of 2 to 5 carbon atoms or halogen, $R^2$ is hydrogen, alkyl of 1 to 4 carbon atoms, alkoxy of 1 to 4 carbon atoms, sulfo, carboxy, aminocarbonyl or halogen, U is a direct covalent bond or is methylene, ethylene, vinylidene or a group of the formula —NH—, —NH—

CH₂—, —CO—, —CH₂—NH—, —NH—CH₂—CH₂—, —CH₂—CH₂—NH—, —O—, —O—CH₂—, —O—CH₂—CH₂—, —CH₂—O—, —CH₂—CH₂—O—, —NH—CO—NH—, —NH—CO—, —NH—CO—O—, —CO—NH— or —O—CO—NH—, alk is alkylene of 1 to 8 carbon atoms or is alkylene of 2 to 8 carbon atoms which is interrupted by 1 or 2 hetero-groups, M is hydrogen or an alkali metal, and n is zero, 1 or 2 (and if n is zero this group is hydrogen).

20. A dye as claimed in claim 1, wherein R is hydrogen.

21. A dye as claimed in claim 2, wherein $K^2$ is a group of the formula

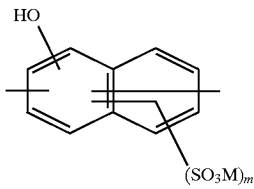

in which M is hydrogen or an alkali metal and m is zero, 1 or 2 and the hydroxy group is attached in the α position of the naphthalene ring.

22. A dye as claimed in claim 3, wherein $K^2$ is a group of the formula

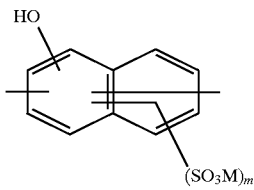

in which M is hydrogen or an alkali metal and m is zero, 1 or 2 and the hydroxy group is attached in the α position of the naphthalene ring.

23. A dye as claimed in claim 4, wherein $K^2$ is a group of the formula

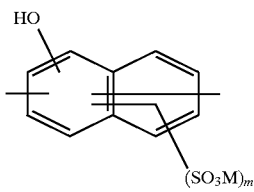

in which M is hydrogen or an alkali metal and m is zero, 1 or 2 and the hydroxy group is attached in the α position of the naphthalene ring.

24. A dye as claimed in claim 5, wherein $K^2$ is a group of the formula

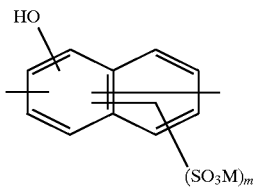

in which M is hydrogen or an alkali metal and m is zero, 1 or 2 and the hydroxy group is attached in the α position of the naphthalene ring.

25. A dye as claimed in claim 6, wherein $K^2$ is a group of the formula

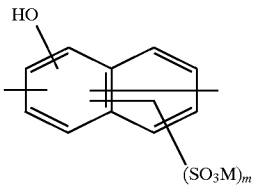

in which M is hydrogen or an alkali metal and m is zero, 1 or 2 and the hydroxy group is attached in the α position of the naphthalene ring.

26. A dye as claimed in claim 1, wherein $Z^1$ or $Z^2$ is a group of the formula (11a), (11b), (11c), (11f) or (11g)

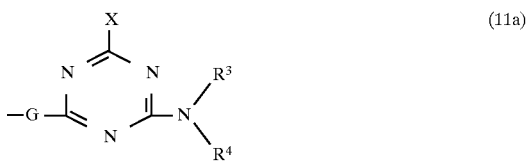  (11a)

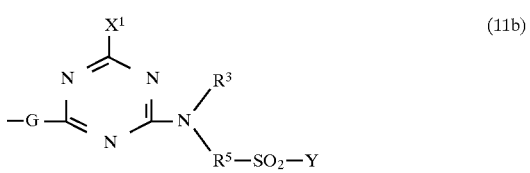  (11b)

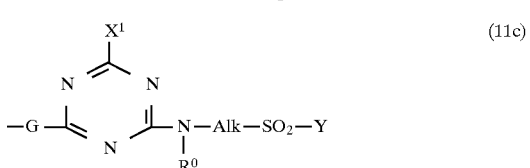  (11c)

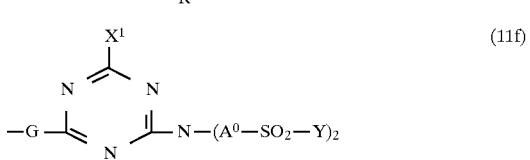  (11f)

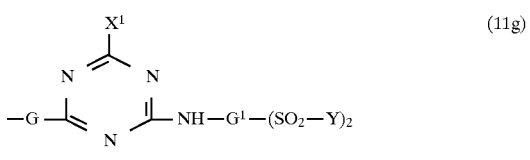  (11g)

in which:

X is chlorine or fluorine;

$R^3$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms;

$R^4$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

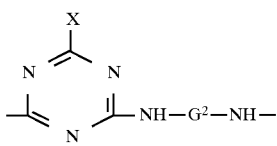

in which X is as defined above and $G^2$ is alkylene of 1 to 6 carbon atoms or phenylene unsubstituted or substituted by 1 or 2 sulfo groups;

$R^0$ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

$A^0$ is alkylene of 1 to 3 carbon atoms;

$X^1$ is chlorine, fluorine, cyanoamino or methoxy;

$R^5$ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

$Y^1$ has one of the meanings of Y or is β-hydroxyethyl;

$G^1$ is a benzene ring which in addition to the two groups —$SO_2$—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —$SO_2$—Y are bonded.

27. A dye as claimed in claim 1, wherein $Z^1$ or $Z^2$ is a group of the formula (11h)

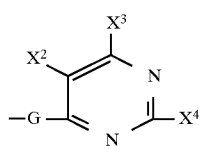

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

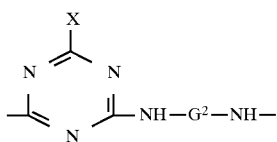

in which X is as defined above and $G^2$ is alkylene of 1 to 6 carbon atoms or phenylene unsubstituted or substituted by 1 or 2 sulfo groups.

28. A dye as claimed in claim 3, wherein $Z^0$ is a group of the formula (11a), (11b), (11c), (11f) or (11g)

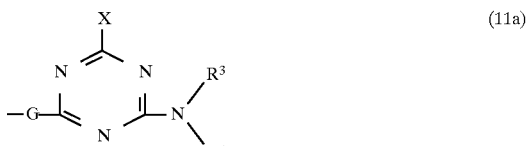

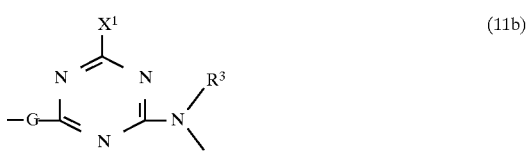

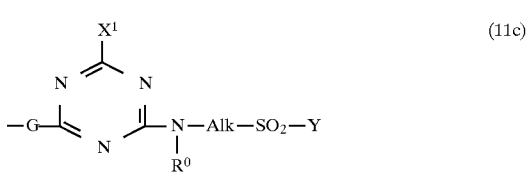

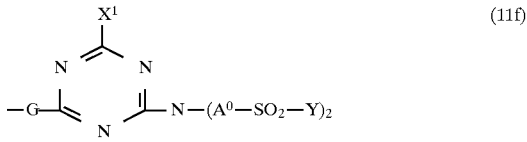

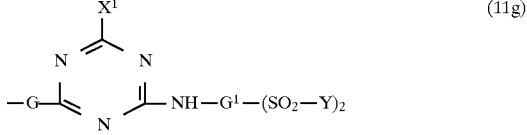

in which:

X is chlorine or fluorine;

$R^3$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms;

$R^4$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

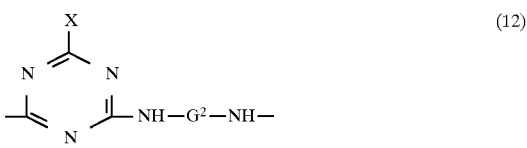

in which X is as defined above and $G^2$ is alkylene of 1 to 6 carbon atoms or phenylene unsubstituted or substituted by 1 or 2 sulfo groups;

$R^0$ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

$A^0$ is alkylene of 1 to 3 carbon atoms;

$X^1$ is chlorine, fluorine, cyanoamino or methoxy;

$R^5$ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

$Y^1$ has one of the meanings of Y or is δ-hydroxyethyl;

$G^1$ is a benzene ring which in addition to the two groups —$SO_2$—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —$SO_2$—Y are bonded.

29. A dye as claimed in claim 4, wherein $Z^0$ is a group of the formula (11a), (11b), (11c), (11f) or (11g)

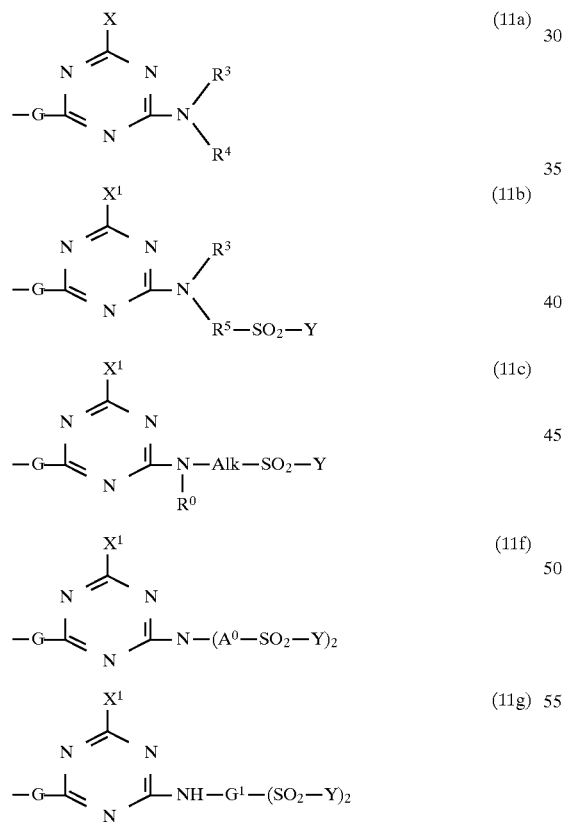

in which:

X is chlorine or fluorine;

$R^3$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms;

$R^4$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

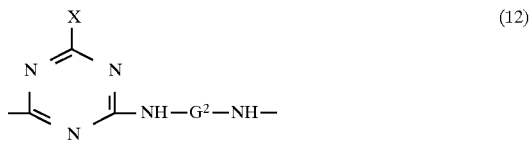

in which X is as defined above and $G^2$ is alkylene of 1 to 6 carbon atoms or phenylene unsubstituted or substituted by 1 or 2 sulfo groups;

$R^0$ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

$A^0$ is alkylene of 1 to 3 carbon atoms;

$X^1$ is chlorine, fluorine, cyanoamino or methoxy;

$R^5$ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

$Y^1$ has one of the meanings of Y or is β-hydroxyethyl;

$G^1$ is a benzene ring which in addition to the two groups —$SO_2$—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —$SO_2$—Y are bonded.

30. A dye as claimed in claim 5, wherein $Z^0$ is a group of the formula (11a), (11b), (11c), (11f) or (11g)

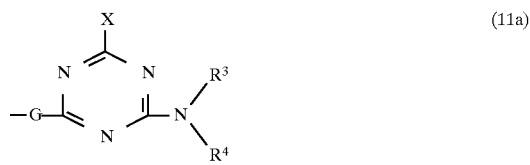

-continued

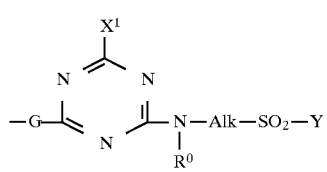
(11b)

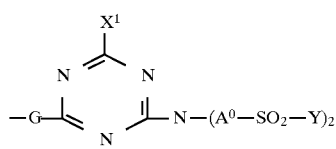
(11c)

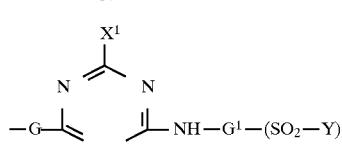
(11f)

(11g)

in which:

X is chlorine or fluorine;

R³ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms;

R⁴ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

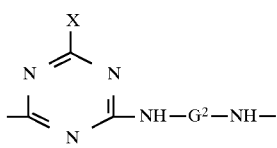
(12)

in which X is as defined above and G² is alkylene of 1 to 6 carbon atoms or phenylene unsubstituted or substituted by 1 or 2 sulfo groups;

R⁰ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

A⁰ is alkylene of 1 to 3 carbon atoms;

X¹ is chlorine, fluorine, cyanoamino or methoxy;

R⁵ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

Y¹ has one of the meanings of Y or is β-hydroxyethyl;

G¹ is a benzene ring which in addition to the two groups —SO₂—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —SO₂—Y are bonded.

31. A dye as claimed in claim 6, wherein Z⁰ is a group of the formula (11a), (11b), (11c), (11f) or (11g)

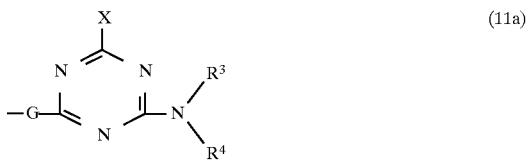
(11a)

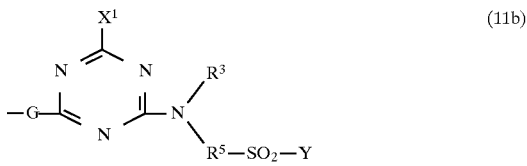
(11b)

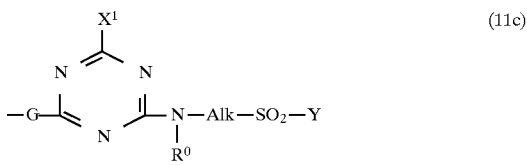
(11c)

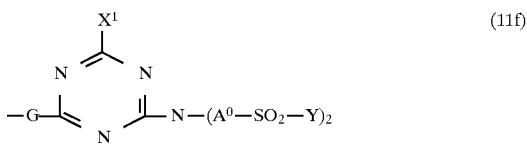
(11f)

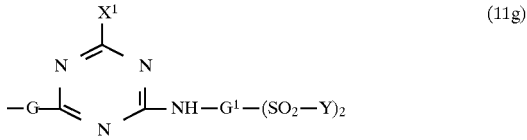
(11g)

in which:

X is chlorine or fluorine;

R³ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms;

R⁴ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

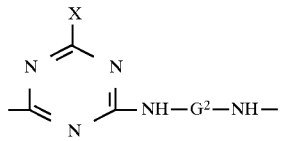
(12)

in which X is as defined above and $G^2$ is alkylene of 1 to 6 carbon atoms or phenylene unsubstituted or substituted by 1 or 2 sulfo groups;

$R^0$ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

$A^0$ is alkylene of 1 to 3 carbon atoms;

$X^1$ is chlorine, fluorine, cyanoamino or methoxy;

$R^5$ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

$Y^1$ has one of the meanings of Y or is β-hydroxyethyl;

$G^1$ is a benzene ring which in addition to the two groups —$SO_2$—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —$SO_2$—Y are bonded.

32. A dye as claimed in claim 7, wherein $Z^0$ is a group of the formula (11a),

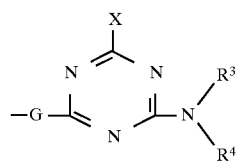
(11a)

-continued

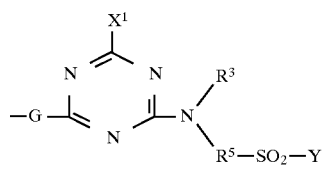
(11b)

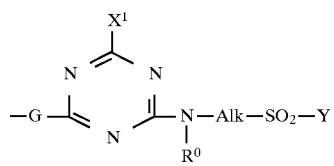
(11c)

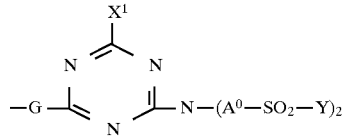
(11f)

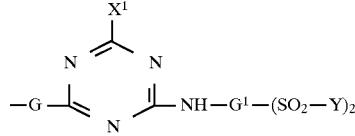
(11g)

in which:

X is chlorine or fluorine;

$R^3$ is hydrogen, alkyl of 1 to 4 carbon atoms unsubstituted or substituted by chlorine, sulfo, carboxy, sulfato, phosphate, hydroxy, alkanoyloxy of 2 to 5 carbon atoms, cyano or alkoxy of 1 to 4 carbon atoms, or is cycloalkyl having 5 to 8 carbon atoms;

$R^4$ is hydrogen, alkyl of 1 to 4 carbon atoms unsubstituted or substituted by chlorine, sulfo, carboxy, sulfato, phosphato, hydroxy, alkanoyloxy of 2 to 5 carbon atoms, cyano or alkoxy of 1 to 4 carbon atoms, or is cycloalkyl having 5 to 8 carbon atoms, or is cyano, or is phenyl unsubstituted or substituted by 1 or 2 substituents selected from the group consisting of sulfo, carboxy, methyl, ethyl, methoxy, ethoxy, chlorine, carbamoyl, sulfamoyl and cyano, or is naphthyl substituted by 1, 2 or 3 sulfo groups;

G is a covalent bond or a group of the formula (12)

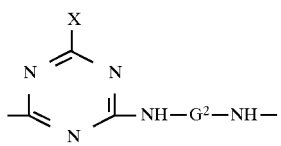
(12)

in which X is as defined above and $G^2$ is alkylene of 1 to 6 carbon atoms or phenylene unsubstituted or substituted by 1 or 2 sulfo groups;

$R^0$ is hydrogen, alkyl of 1 to 4 carbon atoms, phenyl or phenyl substituted by 1 or 2 substituents selected from the group consisting of sulfo, methyl, methoxy, ethyl, ethoxy, carboxy and chlorine;

Alk is alkylene of 2 to 4 carbon atoms;

$A^0$ is alkylene of 1 to 3 carbon atoms;

$X^1$ is chlorine, fluorine, cyanoamino or methoxy;

$R^5$ is phenylene unsubstituted or substituted by 1 or 2 substituents selected from the group consisting of chlorine, sulfo, methyl, ethyl, methoxy, ethoxy and carboxy, or is alkylene of 2 to 6 carbon atoms, or is a group of the formula ALK-O-ALK, ALK-NH-ALK, Phen-O-ALK, ALK-O-Phen, Phen-NH-ALK, ALK-NH-Phen, Phen-ALK or ALK-Phen, in which ALK is alkylene of 1 to 4 carbon atoms and is unsubstituted or substituted by sulfo, hydroxy, sulfato or acetyloxy, and Phen is phenylene unsubstituted or substituted by 1 or 2 substituents selected from the group consisting of methyl, methoxy, chlorine and sulfo;

Y is as defined in claim 1;

$Y^1$ has one of the meanings of Y or is β-hydroxyethyl;

$G^1$ is a benzene ring which in addition to the two groups —$SO^2$—Y where Y is as defined above is optionally substituted by 1 or 2 substituents selected from the group consisting of methyl, methoxy, chlorine and sulfo, or is an alkane radical of 2 to 6 carbon atoms or is a benzene radical which possesses 1 or 2 methylene groups to which one or two, respectively, of the groups —$SO_2$—Y are bonded.

33. A dye as claimed in claim 3, wherein $Z^0$ is a group of the formula (11h)

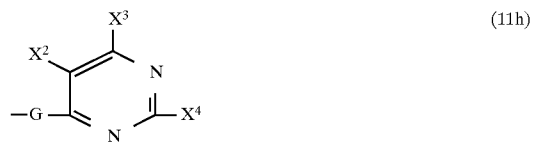

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

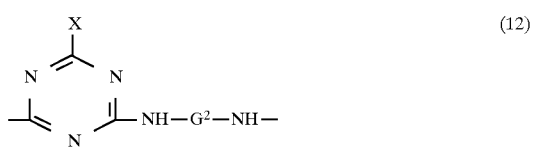

in which X is as defined above and $G^2$ is alkylene of 1 to 6 carbon atoms or phenylene unsubstituted or substituted by 1 or 2 sulfo groups.

34. A dye as claimed in claim 4, wherein $Z^0$ is a group of the formula (11h)

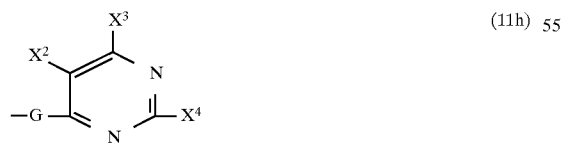

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

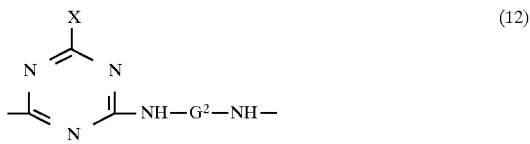

in which X is as defined above and $G^2$ is alkylene of 1 to 6 carbon atoms or phenylene unsubstituted or substituted by 1 or 2 sulfo groups.

35. A dye as claimed in claim 5, wherein $Z^0$ is a group of the formula (11h)

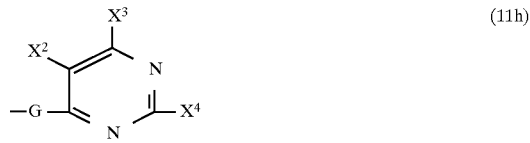

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

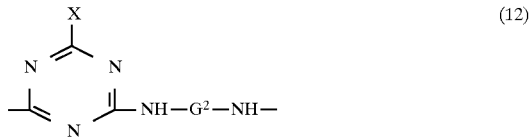

in which X is as defined above and $G^2$ is alkylene of 1 to 6 carbon atoms or phenylene unsubstituted or substituted by 1 or 2 sulfo groups.

36. A dye as claimed in claim 6, wherein $Z^0$ is a group of the formula (11h)

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

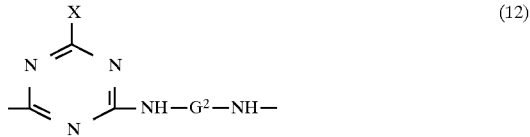

in which X is as defined above and $G^2$ is alkylene of 1 to 6 carbon atoms or phenylene unsubstituted or substituted by 1 or 2 sulfo groups.

37. A dye as claimed in claim 7, wherein $Z^0$ is a group of the formula (11h)

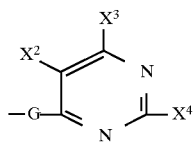

(11h)

in which:

$X^2$ is hydrogen, halogen or cyano;

$X^3$ is hydrogen, halogen, methylsulfonyl or hydroxy and $X^4$ is hydrogen, halogen, methyl, methylsulfonyl or hydroxy, where at least $X^3$ or $X^4$ is halogen or methylsulfonyl;

G is a covalent bond or is a group of the formula (12)

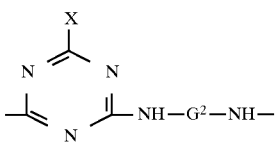

(12)

in which X is as defined above and $G^2$ is alkylene of 1 to 6 carbon atoms or phenylene unsubstituted or substituted by 1 or 2 sulfo groups.

* * * * *